United States Patent
Eliason et al.

[11] Patent Number: 5,976,268
[45] Date of Patent: Nov. 2, 1999

[54] METHOD AND APPARATUS FOR PRESSURE WASHING

[75] Inventors: Scott A. Eliason, Troutdale, Oreg.; Rudolph W. Driscoll, Jr., Woodside; Michael D. Damron, San Jose, both of Calif.; Eduardo M. Garcia, Wilder, Id.

[73] Assignee: EZ Environmental Solutions Corporation, Menlo Park, Calif.

[21] Appl. No.: 09/144,723

[22] Filed: Sep. 1, 1998

Related U.S. Application Data

[60] Provisional application No. 60/065,864, Nov. 14, 1997.

[51] Int. Cl.$^6$ .............................. B08B 3/02; B08B 13/00
[52] U.S. Cl. ................... 134/10; 134/102.1; 134/104.4; 134/111
[58] Field of Search ................ 134/10, 102.1, 134/102.2, 104.4, 109, 111, 182, 183, 200; 210/167; 68/13 R

[56] References Cited

U.S. PATENT DOCUMENTS

| | | | |
|---|---|---|---|
| 1,899,657 | 2/1933 | Zademach | 210/167 X |
| 1,916,806 | 7/1933 | Myrick | 134/183 X |
| 2,788,954 | 4/1957 | Paasche | 210/167 X |
| 3,224,914 | 12/1965 | Benton et al. | 134/183 X |
| 3,971,394 | 7/1976 | Osborne | 134/111 X |
| 4,543,182 | 9/1985 | Gramse et al. | 134/111 X |
| 4,768,534 | 9/1988 | Anderson | 134/183 X |
| 4,818,388 | 4/1989 | Morioka et al. | 210/167 |
| 5,082,558 | 1/1992 | Burris | 134/102.1 X |
| 5,181,399 | 1/1993 | Engel et al. | 68/13 R |
| 5,241,720 | 9/1993 | Engel et al. | 68/13 R X |
| 5,313,811 | 5/1994 | Wasinger et al. | 68/13 R X |
| 5,329,950 | 7/1994 | Barinas | 134/102.1 X |
| 5,499,643 | 3/1996 | Vincent, Jr. et al. | 134/109 X |
| 5,673,715 | 10/1997 | Carter | 134/104.4 |
| 5,785,067 | 7/1998 | Kosofsky | 134/111 X |
| 5,803,982 | 9/1998 | Kosofsky et al. | 134/10 |

Primary Examiner—Philip R. Coe
Attorney, Agent, or Firm—Beyer & Weaver, LLP

[57] ABSTRACT

The present invention relates to methods and apparatus for removing a contaminant from an object. According to one aspect, an apparatus for washing an object which has contaminant is arranged to recover the contaminant. The apparatus includes a support floor that supports an object to be washed and a basin mounted below the support floor. The basin is divided into a plurality of chambers which include a clean water chamber, a secondary water chamber, an oil containment chamber, and a contaminated water receiving chamber which receives water which is contaminated after it is flowed over the object to remove the contaminant. The contaminated water received in the contaminated water receiving chamber must pass sequentially through the oil containment chamber and the secondary water chamber prior to entering the clean water chamber. The clean water chamber is flowably coupled to the secondary water chamber by a first flowpath near the operational water level, while the secondary water chamber is flowably coupled to the oil containment chamber by a second flowpath near the bottom of the basin. The oil containment chamber is flowably coupled to the contaminated water receiving chamber by a third flowpath near the operational water level. The apparatus also includes a first pump which draws and filters water from the secondary water chamber and returns the filtered water to the clean water chamber.

19 Claims, 13 Drawing Sheets

５,９７６,２６８

METHOD AND APPARATUS FOR PRESSURE WASHING

CROSS REFERENCE TO RELATED APPLICATIONS

This application claims priority under 35 U.S.C. 119(e) of provisional U.S. Patent Application No. 60/065,864, filed Nov. 14, 1997, and is related to U.S. patent application Ser. No. 08/732,638, filed Oct. 15, 1996, and now U.S. Pat. No. 5,785,067, and U.S. patent application Ser. No. 08/813,919, filed Mar. 7, 1997, and now U.S. Pat. No. 5,803,982, which are incorporated herein by reference in their entirety.

BACKGROUND OF THE INVENTION

1. Field of Invention

The present invention relates generally to methods and apparatus for use in pressure washing. More particularly, the present invention relates to methods and apparatus for safely washing objects with a pressure washer, or similar device, and recovering contaminants from the objects.

2. Description of the Related Art

Contamination of the environment by man-made substances has been considered a serious problem for a long time. Recently, concern about contamination of earth, air, and groundwater by oil, toxic chemicals, and other hazardous wastes has expanded beyond large-scale industry to encompass the activities of many small businesses including automobile service stations, and many others. Both government regulations and social outcry have placed tremendous pressure on these businesses to avoid discharging hazardous wastes into the environment in the course of ordinary business activities.

Many businesses partake in activities which are likely to produce waste which may be harmful to the environment. For example, in an automobile service station, washing or steam-cleaning auto parts, e.g., an automobile engine, often causes engine oil, gasoline, and other chemicals to enter a storm drain system, or other waterways, thereby leading to the potential contamination of groundwater. In addition, those who service remotely located equipment generally have a need to wash the equipment without discharging hazardous waste into the environment. By way of example, persons who service roof-mounted air conditioners that contain lubricating petrochemicals, trapped pollutants, or other chemicals are not permitted to wash the equipment in a manner that could cause chemicals to run off the roof and into the surrounding environment.

High pressure washing equipment, which is used, for example, to clean auto parts, is generally available. However, many pressure washers do not have containment capability for hazardous materials. Hence, such pressure washers may not prevent hazardous materials from entering the surrounding environment. Some pressure washers may be able to recover some wash fluid, although pressure washers which recover some wash fluid often do not filter hazardous wastes, or do not efficiently filter all hazardous wastes out of the wash fluid. As such, pressure washing systems often generate relatively large volumes of wastewater which must either be processed separately, or placed in barrels for disposal. Further, since such pressure washing systems are often required to handle large volumes of wastewater, the pressure washing systems are not readily moved.

Therefore, what is desired is a portable, zero-discharge wash apparatus which may recover oil, chemicals, and other hazardous materials from an object which is being washed. In addition, what is desired is a wash apparatus which may efficiently recirculate, and repeatedly filter, a washing agent, thereby minimizing the quantity of waste material produced during a washing process. That is, what is desired is a portable, self-contained way to conveniently, efficiently, and safely wash objects, e.g., automobile engines or parts, and recover contaminants from them by providing a controlled water supply to an adjustable pressure washer.

SUMMARY OF THE INVENTION

The present invention relates to methods and apparatus for removing a contaminant from an object. According to one aspect, an apparatus for washing an object which has contaminant is arranged to recover the contaminant. The apparatus includes a support floor that supports an object to be washed and a basin mounted below the support floor. The basin is divided into a plurality of chambers which include a clean water chamber, a secondary water chamber, an oil containment chamber, and a contaminated water receiving chamber which receives water which is contaminated after it is flowed over the object to remove the contaminant. The contaminated water received in the contaminated water receiving chamber must pass sequentially through the oil containment chamber and the secondary water chamber prior to entering the clean water chamber. The clean water chamber is flowably coupled to the secondary water chamber by a first flowpath near the operational water level, while the secondary water chamber is flowably coupled to the oil containment chamber by a second flowpath near the bottom of the basin. The oil containment chamber is flowably coupled to the contaminated water receiving chamber by a third flowpath near the operational water level. The apparatus also includes a first pump which draws and filters water from the secondary water chamber and returns the filtered water to the clean water chamber.

In one embodiment, the contaminant includes oil and debris, and the apparatus further includes a debris filter which collects at least some of the debris while enabling the contaminated water to pass through to the contaminated water receiving chamber. In another embodiment, the first flowpath near the operational water level which flowably couples the clean water chamber to the secondary water chamber is located slightly above the operational water level. In still another embodiment, the third flowpath near the operational water level which flowably couples the oil containment chamber to the receiving chamber is at least partially below the operational water level.

According to another aspect of the present invention, a method for washing an object with water to remove a contaminant includes placing the object over a basin that is divided into a plurality of chambers which include a contaminated water receiving chamber, a secondary water chamber, an oil containment chamber, and a clean water chamber. Water is then flowed over the object to remove the contaminant from the object. The contaminated water is then received in the contaminated water receiving chamber. Water is circulated sequentially through the chambers prior to entering the clean water chamber. The contaminated water is circulated near a top of an operational water level between the secondary water chamber and the oil containment chamber, as well as near the bottom of the basin between the oil containment chamber and the secondary water chamber. The water is drawn from the secondary water chamber through a first inlet to the secondary water chamber, and is filtered. Once filtered, the water is returned through a first outlet to the clean water chamber.

In one embodiment, the contaminant includes debris and oil, and the method further includes collecting the oil in the oil containment chamber. In such an embodiment, the method may also include filtering at least some of the debris from the contaminated water.

DETAILED DESCRIPTION OF THE EMBODIMENTS

High pressure washing equipment is often used to remove contaminants from objects which are being washed by the pressure washing equipment. However, although pressure washers are effective to remove contaminants, which include harzardous materials, from an object, many pressure washers are not designed to contain the contaminants. As a result, such pressure washers may not prevent hazardous materials from entering the environment around the pressure washer. While some pressure washers may be able to at least partially contain wash fluid, the hazardous wastes are typically either not filtered out of the wash fluid, or are not consistently or efficiently filtered out of the wash fluid.

By collecting a washing fluid which contains contaminants, e.g., oil, in a basin and circulating the washing fluid within the basin, the contaminants are typically induced to float to the surface of the washing fluid. Therefore, establishing a flow pattern in the basin which facilitates the efficient "separation" of contaminants from washing fluid would enable contaminants to be readily filtered out of the washing fluid. Such a flow pattern, may allow the contaminated washing fluid to circulate such that contaminants readily rise to the top of the washing fluid level are are filtered out of the washing fluid. While contaminants are filtered out of the washing fluid, the remaining "clean" washing fluid is allowed to be recycled.

Figure 1:
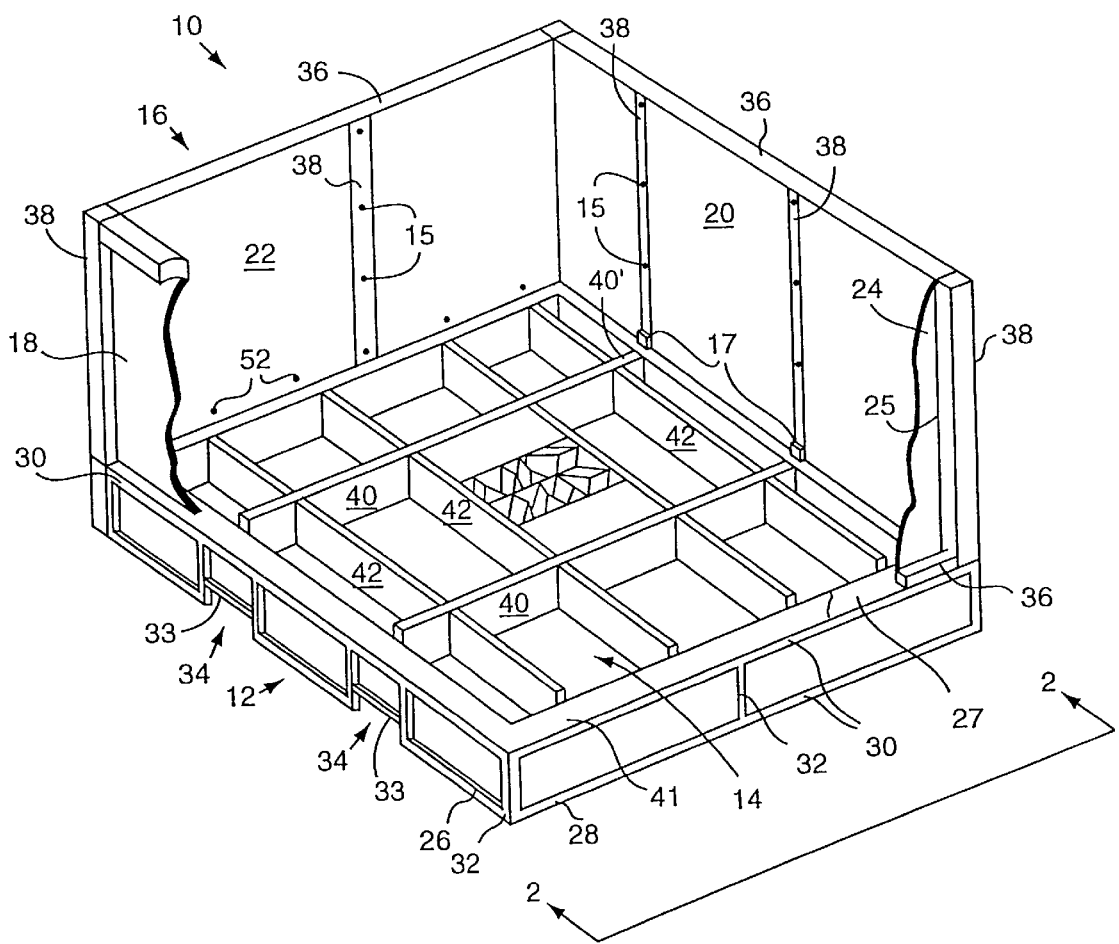
FIG. 1 is a diagrammatic perspective view representation of a washing apparatus in accordance with a first embodiment of the present invention.
Figure 2:
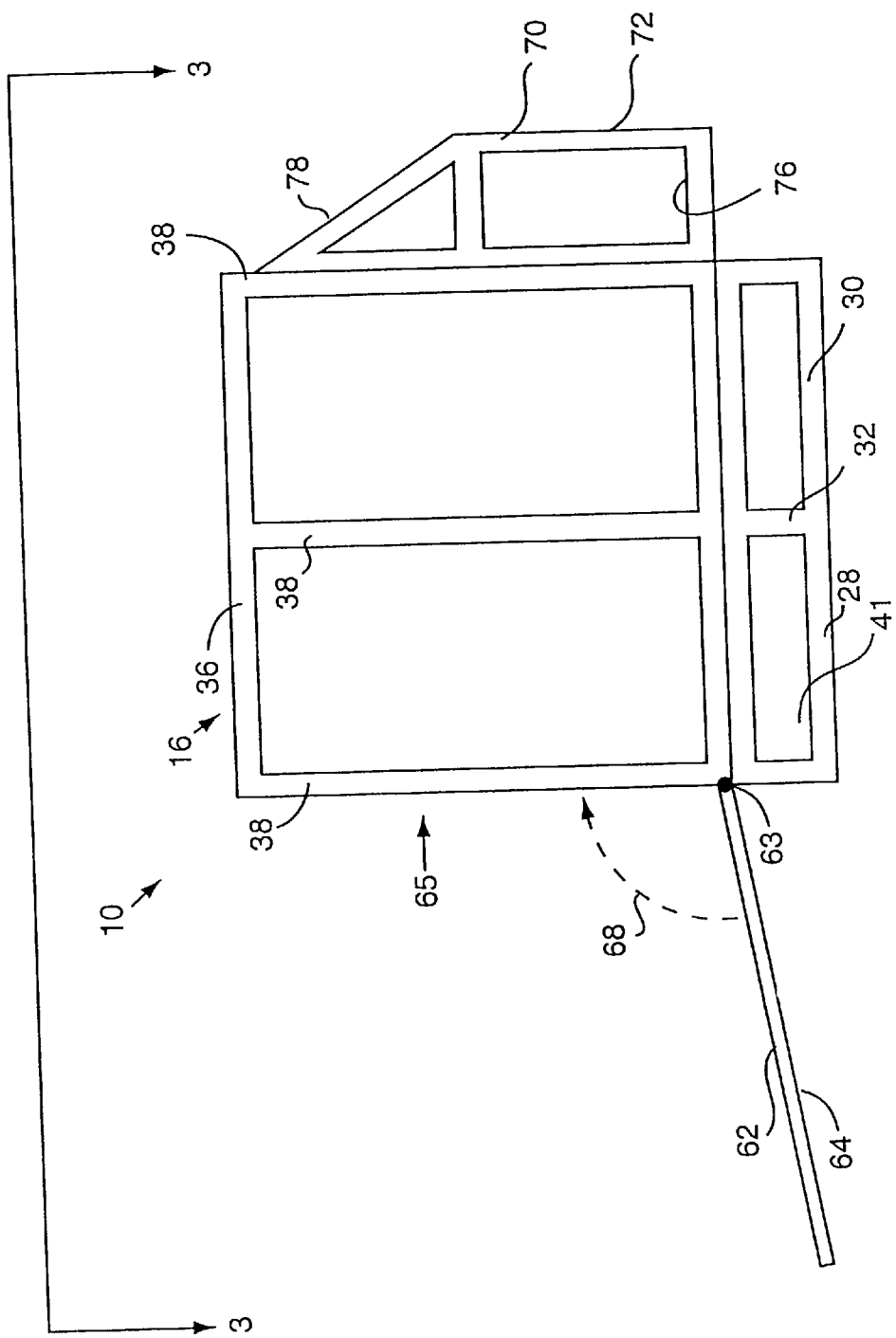
FIG. 2 is a diagrammatic side view representation of the washing apparatus of FIG. 1 in accordance with the first embodiment of the present invention.
Figure 3:
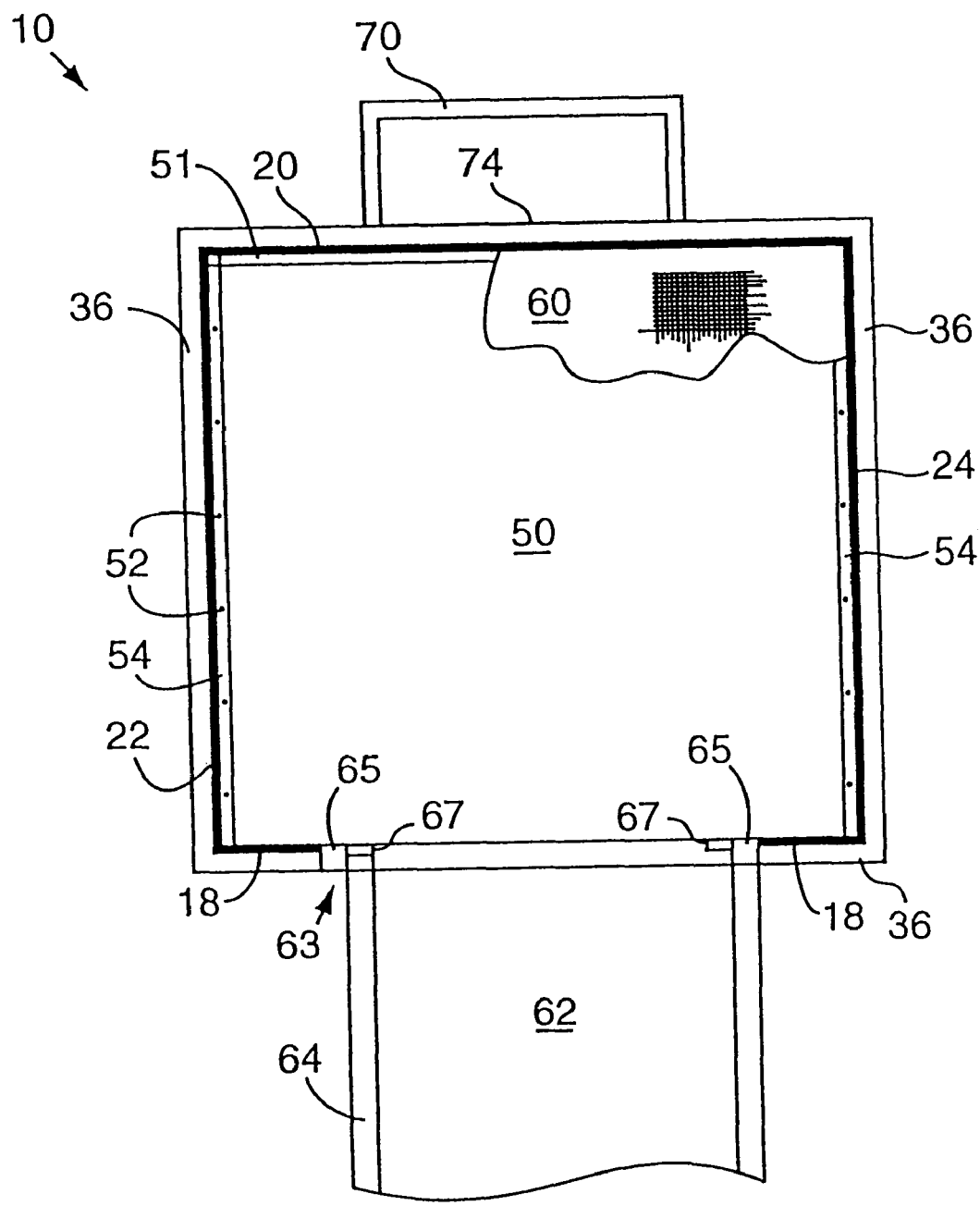
FIG. 3 is a diagrammatic top plan view representation of the washing apparatus of FIG. 1 in accordance with the first embodiment of the present invention.

FIGS. 1, 2, and 3 show a pressure washing apparatus, or wash rack, 10 which includes a base frame 12, a containment tub 14, and a wall frame 16 in accordance with first embodiment of the present invention. Front and rear walls 18, 20 and left and right-side walls 22, 24 are affixed to wall frame 16, thereby forming a rectangular enclosure into which an object is placed for washing. It should be appreciated that in FIG. 1, the front wall 18 and right wall 24 are shown in cutaway, in order to enable details of the tub to be shown.

The base frame 12 is a generally rectangular structure comprising four base side frames, although it should be appreciated that base frame 12 may take on any suitable shape. A front base side frame 26 and a right base side frame 28 are shown in FIG. 1. It should be appreciated that similar rear and left base side frames are also provided. Each of the base side frames is formed from horizontal beams 30 that are joined to vertical posts 32. The beams 30 and posts 20 may be welded aluminum tube stock, structural fiberglass, as for example EXTREN®, which is commercially available from MMFG, or any other lightweight, sturdy material which is essentially non-conductive and non-corroding.

Although posts 32 may be of any suitable size, in the described embodiment, posts 32 are about 9-½" (20 cm) tall, so that the tub 14 is suspended and supported in base side frames 26, 28. Front base side frame 26 has a pair of parallel, transverse fork pockets 34 which provide clearance for the forks of a forklift or a pallet jack, enabling the entire apparatus 10 to be readily moved to a job site or any desired location. A load-bearing brace 33 extends across each fork pocket 34. Braces 33 serve, for example, to contact the forks of a fork lift or pallet jack in order to bear the weight of the apparatus. The rear base frame (not visible in FIG. 1) has vertical posts affixed across the fork pocket area to prevent a fork lift operator from attempting to insert the forks of a fork lift into the rear frame. In one embodiment, tub 14 has a pair of molded fork clearance channels extending rearwardly in alignment with the fork pockets 34 in order to clear the forks. The apparatus also may be lifted to an elevated location in this manner.

The wall frame 16 similarly comprises horizontal beams 36 and vertical posts 38 arranged in a rectangular upright structure. As shown in FIG. 1, the beams and posts that form the wall frame 16 may be made from welded aluminum tube stock, structural fiberglass, or any other suitably lightweight, strong material.

In one embodiment, the wall frame is made in detachable left, right, front and rear wall sections so that the frame may be collapsed into a stack for shipping atop the tub and base frame. The beams and posts have threaded fasteners for securing the wall sections to each other and to the base frame, such that a sealed enclosure is formed. The sealed enclosure prevents contaminants washed off of an object from entering the surrounding environment. Use of threaded fasteners also allows the apparatus to be disassembled into flat wall sections which may be stacked in compact fashion for shipment, permits one person to assemble the apparatus by eliminating nuts, and eliminates water leakage paths which would occur if through-bolt holes were used.

Gaskets 25 are secured to the wall posts and the base frame to ensure a tight seal between the base frame and the wall sections. The gaskets may be foam tape or any other suitable, resilient material which runs the length of the posts and beams. Walls 18, 20, 22, and 24 are secured to the wall frame 16 with screws 15. The walls are typically fabricated from a HYZOD polycarbonate sheet, or an equivalent material which is both non-conductive and substantially impervious to attack by oil, solvents, and other hazardous materials. In the described embodiment, walls 18, 20, 22, and 24 may be approximately 40 inches, or about one meter, in height. In general, however, walls 18, 20, 22, 24 may be of any height which adequately contains the spray of a washing agent within the walls, while still enabling an operator to reach over or lean into the apparatus to wash an object. Walls 18, 20, 22, and 24 are made sufficiently high to prevent an operator from falling out of the apparatus while working within the apparatus. In some embodiments, the walls are made of a transparent material so that an operator may see through them to steer the apparatus when it is on a forklift, pallet jack or other moving equipment.

The tub 14 may be made from any suitable material. By way of example, tub 14 may be made from stainless steel. Alternatively, tub 14 may be made, at least in part, from a molded high-density polypropylene basin, or an equivalent sealed pool or basin with high perimeter walls that are strong enough to contain water. Since the tub 14 itself may not carry a heavy load placed on it, in one embodiment, tub 14 has a plurality of load-bearing longitudinal beams or walls 40 and a plurality of lateral beams or walls 42. A secondary containment tub may be provided either within or outside tub 14 to provide extra security against spillage of hazardous materials.

Figure 4:
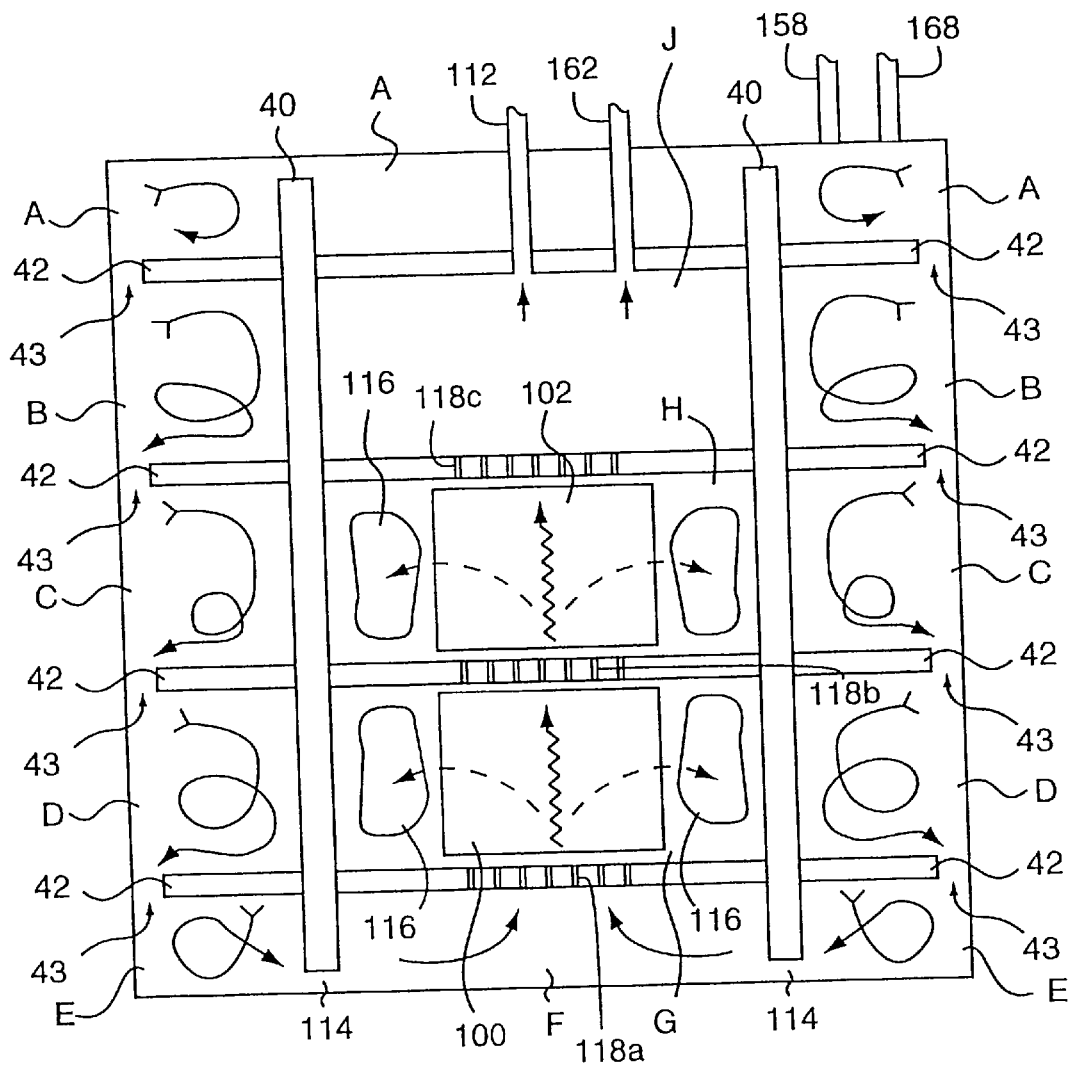
FIG. 4 is a diagrammatic top view representation of fluid flow paths in accordance with the first embodiment of the present invention.

The beams 40, 42, which are also known as baffles or baffle walls, snugly interlock so that fluid may not cross the beams unless a hole is provided in the beam, thus subdividing the tub into a plurality of containment compartments designated A through J in FIG. 4. When an object is washed with a washing agent in the apparatus, the tub and its containment compartments receive the washing agent and any hazardous materials washed off the object. Tub 14 has flanges 41 around its perimeter which extend over and rest on the beams 30 of the base frame. The lower beams 36 of the side walls rest on a tub gasket 27 and on the flanges, and are fastened to the beams 30 using threaded fasteners, forming a sealed sandwich which prevents release of contaminants.

Any suitable tub 14 and supporting beams may be used in apparatus 10. By way of example, tub 14 and supporting beams may be a modified containment system such as the CONTAIN-IT PLUS available from Containment Corporation, Los Alamitos, Calif., USA, or the type shown in U.S. Pat. Nos. 4,930,632 and 5,036,976, both of which are issued to Eckert, which are incorparated herein by reference in their entirety. Such containment systems are intended for spill containment of palletized barrels of hazardous material, but not for use in a washing apparatus. This type of containment system is modified, e.g., by adding inlets and outlets, in one embodiment. The containment system may further be modified by removing a downward, hanging lip on the perimeter of the tub, and by making other necessary changes described below. Also, the beams may be modified by making openings, e.g., holes, in the beams to permit water to flow between containment compartments. The holes, in one embodiment, may be arranged such that they are located at approximately the surface level of the fluid contained in the washing apparatus. By arranging the holes in the beams at the surface of the fluid, the flow of oil, which may be located at the surface of the fluid, may be facilitated between compartments. Alternatively, the holes, in another embodiment, may be arranged such that some holes are located at approximately the surface level of the fluid contained in the washing apparatus, while others are located at approximately the bottom of the tub.

As shown in FIG. 3, a subfloor 50 rests atop the beams 40, 42. Subfloor 50 is held spaced apart from at least some of the walls 18, 20, 22, 24 by a plurality of spacers 52 affixed to the lower inside face of the walls 18, 20, 22, 24. Thus, a narrow gap 54, which may have a width of approximately ¾" (16 mm) in one embodiment, is provided on three sides of subfloor 50 to enable washing fluid and debris to flow into tub 14. It should be appreciated that, in general, a narrow gap may be provided on any number of sides of subfloor 50. Subfloor 50 generally rests flat on beams 40, 42 to provide a solid surface over tub 14, and to help reduce heat loss when the water is in a heated state.

A stabilizing bar 51 extends across the rear edge of the subfloor 50. Bar 51 transfers the weight of the apparatus to the cleats 17 when the apparatus is lifted. The tub has little compressive strength, whereas the beams 40, 42 and the frame may carry substantial weight. To aid in transferring the weight of the apparatus to the frame, a pair of cleats 17 are secured to the rear wall frame through the rear wall 20. When the apparatus is lifted, and when a heavy object is placed in the apparatus, weight is transferred from the beams to bar 51 and then to the cleats. In particular, upward pressure by the rear ends 40' of beams 40 is exerted on cleats 17 and, hence, is transferred to rails 36, posts 38, and the base frame. In short, cleats 17 effectively bear and transfer all the weight of tub 14, beams 40, 42, and any water in tub 14 to the frame.

The subfloor 50 is removable to provide access to the tub 14. The subfloor is a non-conductive, rigid material such as fiberglass or a composite material. A non-conductive, non-skid floor mat 60 lies on the subfloor 50 to slightly elevate the object being washed, and anyone standing in the apparatus, above the subfloor. This causes wash fluid to collect below the floor mat, preventing pooling and reducing spray reflection during pressure washing. Thus, the floor mat 60 helps prevent hazardous materials from splashing out of the apparatus and generally improves the safety of the operator. The floor mat may be made from FLEXMAT molded grating or an equivalent pliable, non-skid matting.

A ramp 62 is hinged to the base frame between the front walls 18. The ramp comprises a ramp wall 66 affixed to a welded frame of beams 64. Holes 63 ride on axles (not visible) protruding inwardly from posts 65, to enable hinged movement of the ramp 62. Other types of heavy duty hinges may be used. The ramp may be folded down, as shown in FIG. 2, to enable heavy objects to be rolled into the apparatus or to hand carry objects into the apparatus. As shown by arrow 68, before an object is washed, the ramp is moved upward and rests against flanges 67 protruding from posts 65 of the front wall frame 16 adjacent the front wall 18. The ramp 62 is held in place by two latches (not shown). The ramp 62 is covered with a subfloor and non-skid grating like those used over the tub 14. It should be appreciated that ramp 62 may generally take many other suitable forms.

Figure 5:
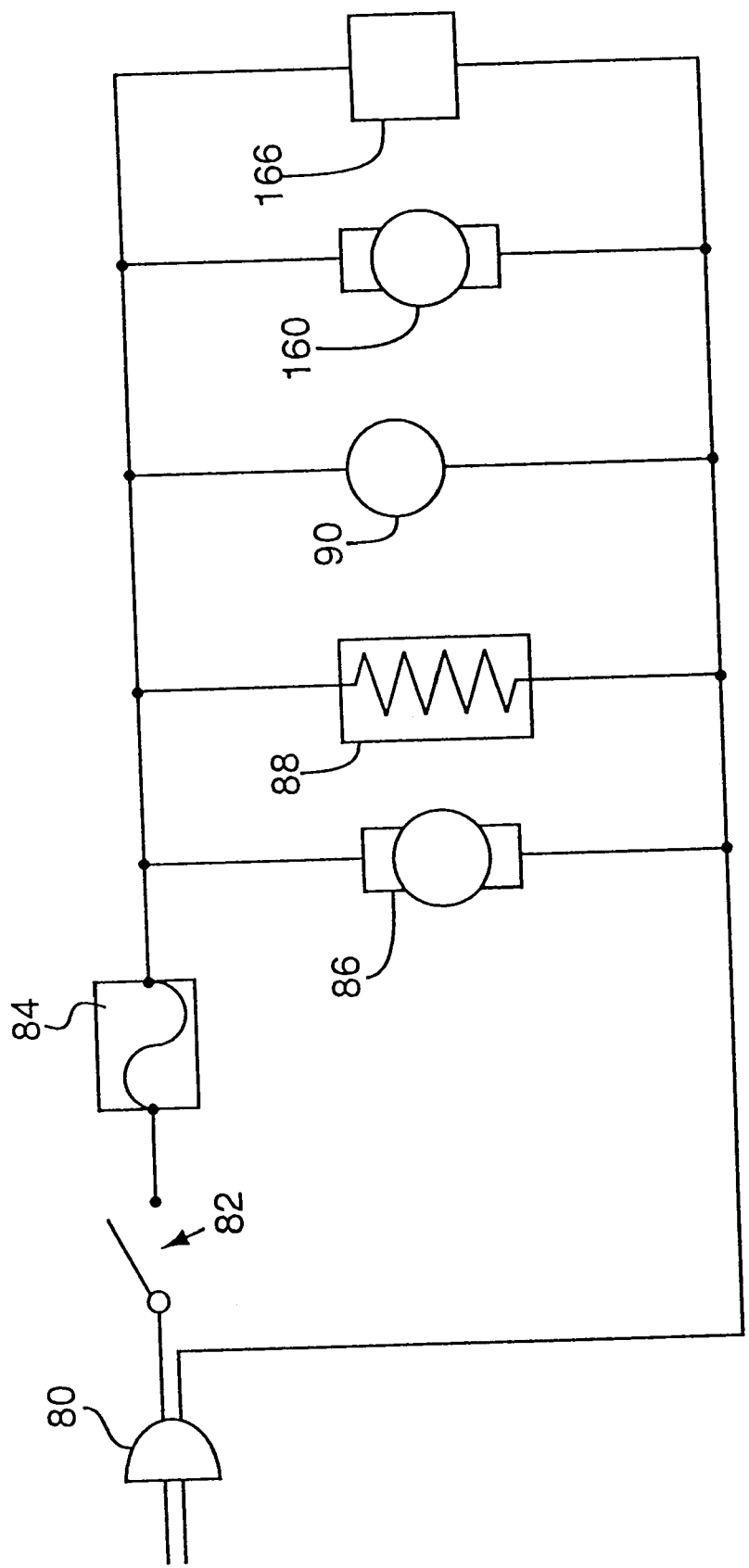
FIG. 5 is a schematic diagram of electric components in accordance with the first embodiment of the present invention.
Figure 6:
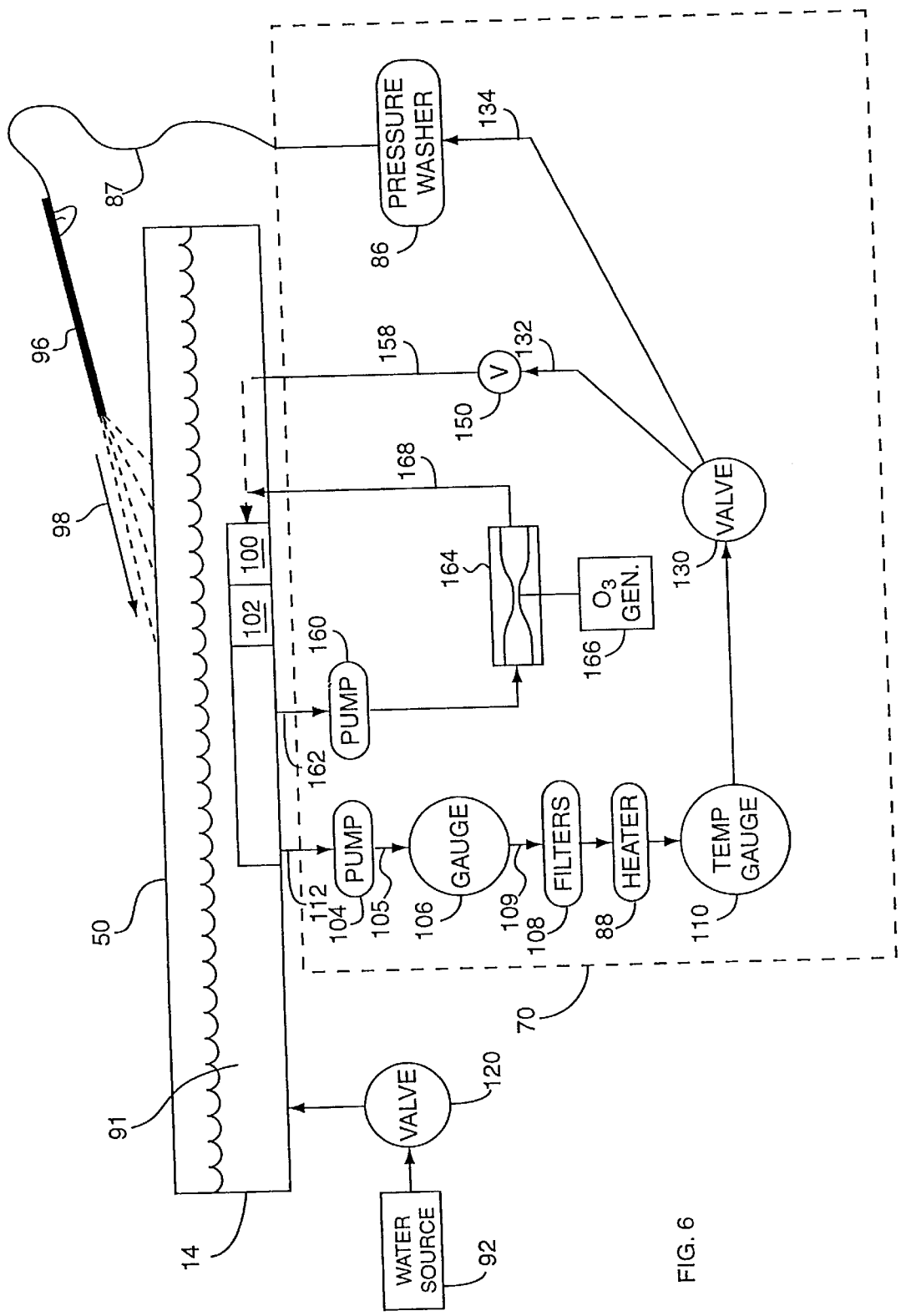
FIG. 6 is a schematic diagram of hydraulic components in accordance with the first embodiment of the present invention.
Figure 7:
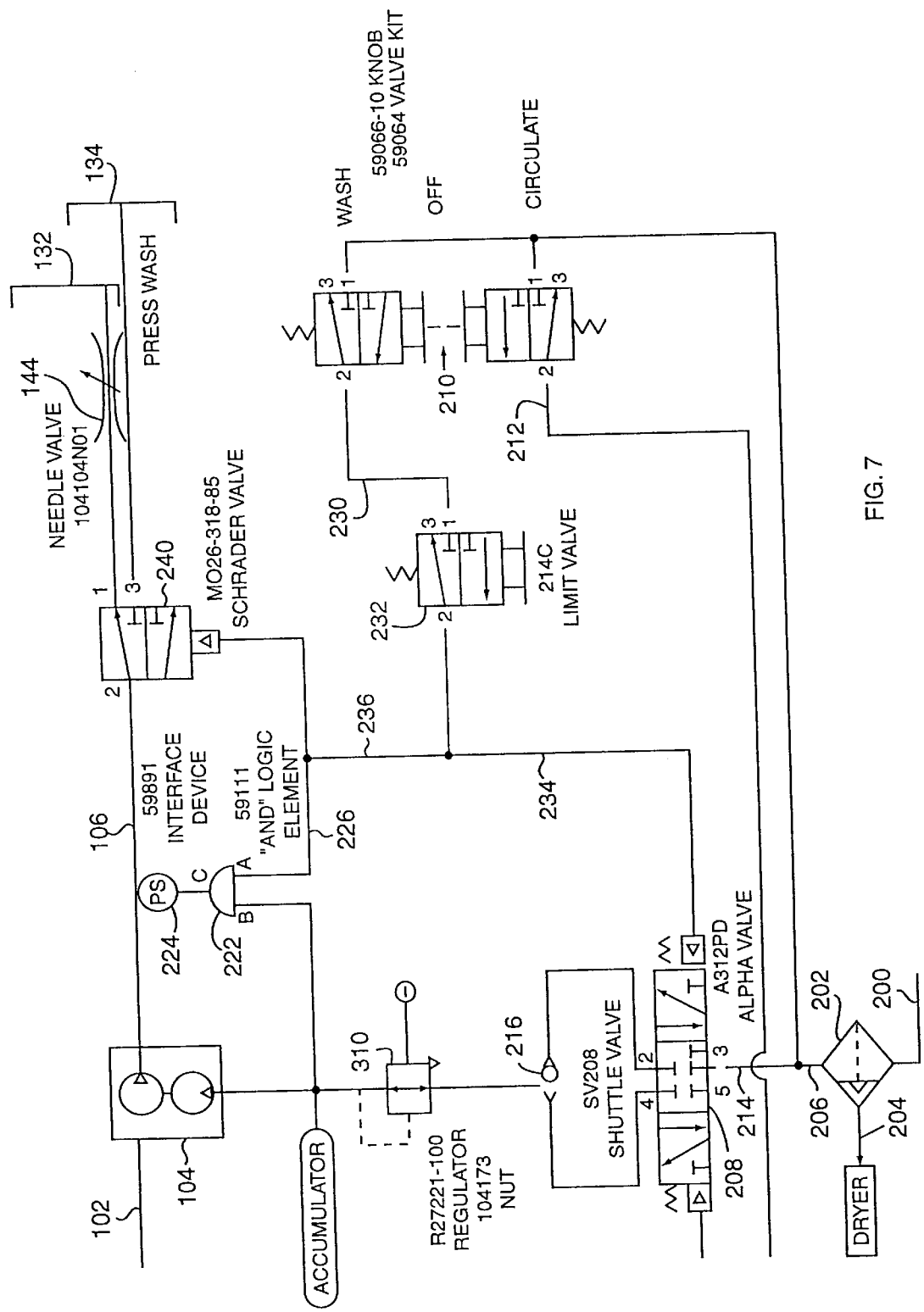
FIG. 7 is a schematic diagram of pneumatic components in accordance with the first embodiment of the present invention.

Control unit 70 is attached to the rear wall frame, and encloses control equipment described below. Control unit 70 is removable and may be attached to an enclosure of any dimension suitable for a particular object to be washed. For example, the enclosure and tub may take the form of an elongated rectangle to accommodate an object such as a motorcycle. In one embodiment, control unit 70 may be removed and stacked on the collapsed frame of the apparatus for transportation purposes. In general, the particular dimensions and structure of control unit 70 may be widely varied. Further, control unit 70 may be made using a frame 72 fabricated from a material such as, for example, aluminum tubing or fiberglass. Control unit 70 has a rear wall 74 and a floor 76 to which the components shown in FIGS. 5, 6, and 7 are mounted. These components need not be mounted in any particular place within control unit 70. A control panel 78 provides a mounting surface for gauges, control knobs, and dials which are associated with control unit 70.

FIG. 6 shows a hydraulic system, that is, components and paths used to move water through the apparatus, in accordance with the first embodiment of the present invention. In the description of this system, the term "water" is used to refer to a washing agent used to wash contaminants from an object. However, detergents or other suitable washing agents may be used. Therefore, the invention is not limited to water as a washing agent.

One embodiment of the mechanical flow of water through the tub is shown in FIG. 4, in which the arrows represent the direction of water flow. For clarity, in the following discussion, aspects of the invention shown in FIG. 4 and FIG. 6 will be discussed together for clarity. Initially, the tub 14 is filled with water 91 to a pre-determined depth. Although the predetermined depth may be widely varied, in one embodiment, the predetermined depth is approximately 7 inches, or about 18 centimeters. In general, any depth which is suitable to prime the system and to ensure proper pump operation and proper filtration is suitable. Similarly, the volume of water in tub 14 may also be widely varied, and may be dependent on the application with which tub 14 is to be used. In one embodiment, the volume of water used to fill tub 14 may be in the range of approximately fifty to approximately sixty gallons, as for example approximately fifty-five gallons.

As described above, beams 40, 42 rest in tub 14, and fit snugly against one another to form a plurality of dammed containment chambers, or compartments, A, B, C, D, E, F, G, H, J. As shown in FIG. 6, a pressure washer 86 provides a flow of high-pressure water through a hose 87 to a wand 96. Wand 96 is swept over the object to be washed, causing water to cascade onto subfloor 50, as indicated by arrow 98. In the described embodiment, the water generally only enters compartments A, B, C, D, E and F because the gaps in the subfloor are provided only at the sides and front of the subfloor. Also, in the described embodiment, water may not flow laterally through beams 40 except through gaps 114 which lead to compartment F.

An inlet pipe 112 is provided at the rear of the tub and is coupled to a first pump 104 which draws water 91 from the tub 14 through the inlet pipe 112. The inlet pipe 112 has a pick-up screen covering its open end in tub 14 which serves to prevent relatively large particles from entering pump 104.

In operation, pump 104 provides substantially continuous suction through the inlet pipe 112. As a result, when an object is being washed, runoff water and contaminants, e.g., a contaminated slurry flow, typically will initially enter compartments A, B, C, D, and E. In these compartments, the water tends to swirl around, as shown by the arrows, until water exits the different compartments through gaps 43 located at the ends of the beams 42. Each beam 42 tends to act as a vertical weir to enhance the break down of suspended solids, which fall to the bottom of tub 14.

Eventually the water and the contaminants move into compartment F through gaps 114. In the described embodiment, holes 118a in one of the beams permit suction from the pump 104 to draw the water from compartment F, as well as through a first water/oil separator 100, which is located in compartment G. A plurality of holes 118a are provided to conform to inlet points of separator 100. As shown by the arrows in compartment G, separator 100 permits cleaned slurry water to flow toward outlet pipe 112, while oil and other contaminants rise to the surface of separator 100, and are discharged to the sides of separator 100. As oil and other contaminants are discharged to the sides of separator 100, the oil and other contaminants falls into a pair of capillary absorbent "socks" 116, or equivalent absorbent arrangements. Socks 116 generally absorb many times their weight in oil and other contaminants through capillary action. Heavy particles typically fall out of separators 100 and settle to the floor of tub 14. In one embodiment, filters may be used to collect heavy particles. Embodiments of tubs which include filters will be described below with respect to FIGS. 9 and 10.

Suction from pump 104 further urges cleaned water exiting separator 100 to flow through holes 118b into a separator 102, located in compartment H, in which the oil/water separation process is repeated. More oil or contaminants rise in separator 102 and are discharged into another pair of absorbent socks 116. Separated water flows through holes 118c into a clean water compartment J. Suction from pump 104 draws the cleaned water from compartment J into inlet pipe 112. Inlet pipe 112 is mounted at a low position in the rear-most beam 42, so that any residual oil floats and is not drawn into inlet pipe 112.

At this point, the cleaned water is drawn by pump 104 and driven under pressure through a hose 105 to a pressure gauge 106 which may be mounted on control panel 78. Thus, the gauge reads the output pressure of pump 104. The water next flows through at least one filter 108 having an intake 109 and an outlet 111. More filters may be used to remove successively smaller particulates and molecules from the water. For example, filter 108 may be in the range of approximately a 100 micron filter to approximately a 150 micron filter series, which is coupled to a string-wound filter that is in the approximate range of a 30 micron to a 100 micron string-wound filter series that is, in turn, coupled to approxiamtely a 10 micron to 30 micron polypropylene filter. The filters may generally be arranged to perform coalescing filtration by routing unfiltered water into the center of the filter, and drawing filtered water out the sides of the filter. It should be appreciated that the number of filters may be varied without affecting the scope of the invention. The filters may include, but are not limited to, string-wound, pleated cellulose, or polypropylene filter cartridges such as those commercially available from Met Pro Corporation, Keystone Filter Division, Hatfield, Pa., USA.

The difference in pressure displayed by a water gauge 106 and an air gauge, as will be described below with respect to FIG. 7, represents the restriction imposed by the filters, as well as line friction in the water hoses, tub, and piping. Typically, the restriction will be in the range of about 15–20 PSI for clean filters, depending upon both the filtration capacity of the filters and the type of filters. Gauges may generally be used to aid in the determination of when the filters are dirty by observing a change in the pressure difference or restriction. The time at which a filter is changed may be widely varied.

Filtered water exiting filter outlet 111 is fed to a heater 88 which heats the water to a pre-determined temperature, as for example a predetermined temperature that is in the range of approximately 140 to 180 degrees F. Water at this temperature has markedly improved cleaning effectiveness. The heated water passes through a temperature gauge 110, such as a sight-glass type, which enables an operator to read the temperature of the heated water and also verify the clarity of the filtered water. Heating a loaded tub 14 of cold water may take several hours. Therefore, the apparatus may include a digital clock coupled to the apparatus for turning the entire apparatus on, in recirculation mode, to pre-heat the water starting several hours before an operator begins work with the apparatus.

Upon exiting the temperature gauge 110, the water arrives at a valve 130 having two output paths 132, 134. The valve 130 may be, for example, a three-way Schrader air-actuated valve. Under pneumatic control, as discussed below, the valve 130 may be set for output on a recirculating path 132 or a wash path 134. When the recirculating path 132 is selected, water flows back to the tub 14 for re-use. Specifically, the recirculation path 132 includes an outlet pipe 158 which connects the valve 130 to a compartment A in the tub 14. Thus, path 132 enables the apparatus to operate in a closed manner with zero discharge of filtered water. This ensures that any remaining toxins stay within the system and do not enter groundwater or a storm drain system. It also improves the efficiency of the separation process by forcing water to the beginning of the compartment circulation cycle. In addition, the recirculation path 132 returns filtered water to the tub for re-use, which greatly reduces the quantity of wastewater. The filtered water may be left in the tub with any residual contaminants. The contaminants may then be wiped or vacuumed out of the tub and disposed of, resulting in virtually zero wastewater discharge. Other containments are trapped in the capillary socks, which are disposable, as for example as hazardous waste.

When the wash path 134 is selected, the valve 130 routes heated water to a second pump such as the pressure washer 86 which generates high-pressure water to a manually operated washing wand 96. A separate flow of detergent or washing chemicals may be routed through the wand.

Under certain conditions it is desirable to adjust the flow rate of water leaving the second pump. For example, chemical washing agents or detergents in the apparatus may change the thermal conductivity or specific heat of the water, requiring reduced flow through the heater to heat the water sufficiently. Therefore, a manually adjusted flow control valve 150 is provided to regulate the flow rate of the water after it leaves the pump.

The washing apparatus may also include an ozonation system to ozonate the water in the tub 14. The ozonation system includes a recirculation pump 160 which draws water from clean-water compartment J into an inlet pipe 162. Typical operation parameters for the recirculation pump 160 include a flow rate in the range of approximately 5 to approximately 10 gallons per minute, e.g., about six gallons per minute and a pressure of in the range of approximately 10 to approximately 20 PSI, e.g., about 15 PSI. From the recirculation pump, the water flows through a gas-liquid mixing device such as venturi-type injector 164. The injector 164 is connected to an ozone generator 166. As the water flows through the injector 164, an area of low pressure is created at the constriction of the venturi. The low pressure in the injector 164 draws ozone from the ozone generator 166, and mixes it with the water. The ozonated water is then returned via an outlet pipe 168 to one of compartments A in tub 14.

The ozone generator 166 operates by drawing oxygen from the atmosphere and subjecting the oxygen to ultraviolet radiation. The ozone generator 166 may be a model CS-1200 ozone generator available commercially from Clearwater Technologies capable of generating 0.25 grams of ozone per hour. Ozone is highly oxidizing, and will attack substantially any contamination in the water. However, given a typical total volume of water, e.g., approximately fifty to sixty gallons, contained within a tub, an ozone generation rate of 0.25 grams per hour will generally be sufficient to oxidize contaminants without causing damage to the components of the washing apparatus. Both ozone generator 166 and recirculation pump 160 may be activated any time that power to the washing apparatus is turned on. Because ozone has a half-life of approximately twenty minutes, the recirculation mode is used to constantly replenish the ozone in the water. In one embodiment, if tub 14 has a volume of approximately fifty-five gallons, it generally takes approximately nine minutes for water drawn through inlet pipe 162 to return to clean-water compartment J.

An external water source 92, such as a faucet or a hose, may be separately coupled to tub 14 through a differential pressure valve 120. External water source 92 provides fresh make-up water for replacement of tub water lost through evaporation. In this arrangement, valve 120 is submerged in tub 14 and senses water pressure above valve 120. When the pressure decreases to a predetermined threshold which indicates a low water level, valve 120 opens, permitting make-up water to enter and fill tub 14. Since the use of heated water in the washing apparatus increases the rate of water lost to the atmosphere through evaporation, the inclusion of external water source 92 is often desirable.

The number of oil-water separators and capillary socks used with a washing apparatus may be varied depending on many factors including, but not limited to, the level of contamination of the objects to be washed. Thus, each system may be tailored to match cleaning needs of a particular object or industry. By way of example, in one embodiment, pump 104 may be an ARO 66602x series ¼" port air-operated diaphragm pump, which is available commercially from ARO Fluid Products Division, Bryan, Ohio USA. An air-operated pump is advantageous to reduce the likelihood of igniting flammable contaminants, and to prevent electric shock. Alternatively, a diaphragm pump is advantageous because it has no impeller which may potentially break. Some air-operated pumps may also be grounded, which aids in the dissipation of static electricity charges that may build up during washing.

In general, any suitable oil-water separators and capillarty socks may be used in a washing apparatus. Suitable oil-water separators may include, but are not limited to, MPAK coalescing plate separators, which are available commercially from Facet International, Inc., Tulsa, Okla. USA. Suitable absorbent, capillary socks may include SPILCAT capillary absorbents which are available commercially from HYTEC Environmental Equipment, Walnut Creek, Calif. USA.

FIG. 5 shows electrical connections in accordance with an embodiment of the present invention. In general, the electrical system is minimized to reduce the potential for igniting combustible materials washed from an object and to reduce shock hazard. A plug 80 is coupled to a source of alternating current at, for example, 120 volts a.c. or 220 volts a.c. A main power switch 82 enables disconnection of the power. Preferably the circuit is protected by a high-current (80 ampere) ground fault circuit interrupter 84 such as Leviton Cat. No. 6895. At least five devices are connected across the voltage source. An electric pressure washer 86 uses the a.c. current to generate a high-pressure stream of fluid, such as water, from a low-pressure input stream. A heater 88 heats the fluid to improve washing effectiveness. Heater 88 may comprise a 3000-watt hot tub/spa heater such as model HTTR, HTHX, or STX, which are available commercially from Vulcan Electric Co., Kezar Falls, Me. USA. An hour usage counter 90 enables an operator to monitor the amount of time for which the apparatus has been used. Both ozone generator 166 and recirculation pump 160 are connected across the voltage source so that they are both activated any time that main power switch 82 is closed.

When tub 14 contains a large volume of cold water, heating the entire volume to a temperature sufficient for improved cleaning may take several hours. The water may be pre-heated automatically, before an operator arrives for a work session, using an arrangement which includes a programmable clock. A suitable clock may be a clock of the type that is often used to control spa heaters. One suitable clock which is available commercially from BRK Industries includes a 30-amp current switching load, as well as an override feature. Such a clock further includes a digital clock module coupled to a solenoid-driven air valve, which, in one embodiment, is connected in series with an air pressure source 200, as shown in FIG. 7. The current time of day is preset, and the desired start time is preset on the clock. At the preset time, the clock causes the solenoid to open the valve. The system is left in circulate mode while the clock is running. Thus, when the preset time arrives, the clock will open the valve and permit air to activate the system, thereby turning on water circulation and the heater.

The apparatus is controlled using a pneumatic control and signaling system as shown in FIG. 7 in accordance with the first embodiment of the present invention. Pneumatic signaling is preferred to an electrical system for a number of different reasons. By way of example, pneumatic signaling is simpler, offers greater fire safety, and reduces the risk of electric shock. Reducing the risk of electric shock is particularly desirable due to the fact that the entire pressure washing apparatus, including control unit 70, may get wet during a washing process.

Air pressure source 200 feeds the pneumatic system, preferably at at pressure in the ranged of approximately 40 PSI to approximately 100 PSI, from an external compressor, or compressed gas bottle. In the described embodiment, air pressure source 200 is coupled to a quick-disconnect coupling 202. One branch of coupling 202 is arranged to feed an external dryer wand which may be used to blow-dry a washed object. Another branch 206 of coupling 202 is coupled to an alpha valve 208 and to a rotary control valve 210. Control valve 210 has three settings: "off," "wash," and "circulate." In the off setting, air pressure source 200 is disconnected, and the pneumatic system does not operate. In the circulate setting, the pneumatic system will circulate water, but the pressure washer does not operate, so objects may not be washed. In the wash setting, typically only the pressure washer operates.

When control valve 210 is in the circulate setting, control valve 210 routes an air signal 212 to alpha valve 208, which opens, thereby permitting air to flow on a path from path 214 to a shuttle valve 216. Air then enters a flow regulator 310. Regulator 310 may be manually adjusted to vary the air pressure downstream from regulator 310 which drives pump 104. Pump 104 outputs water at the same pressure as the input air pressure. Thus, by adjusting regulator 310, an operator may change the water flow rate of pump 104.

Air exiting the regulator 310 is also coupled to an AND logic device 222, As described above in connection with FIG. 6, the pump 104 receives input water from the tub 14 through pipe 112, and passes water out on line 105. A pressure sensor 224 is coupled to the AND device 222, and is located adjacent to the water line 105. The AND device turns ON only when sufficient air pressure in line 226 is sensed by the pressure sensor. This acts as a safety mechanism, keeping the air pump 104 from running with zero or insufficient air pressure, and thus preventing the apparatus from feeding a "dry line" to the pressure washer 86. After exiting the AND device, air is fed to the Schrader valve 240. Thus, when the control valve 210 is in the recirculate position, and sufficient water pressure exists in line 105, the Schrader valve moves, causing water to pass from line 105 through a needle valve 144 to the recirculation path 132.

When the control valve 210 is in the wash position, an air signal is fed on line 230 to a limit valve 232. The limit valve 232 is mounted adjacent to the ramp 62; if the ramp is closed, the limit valve feeds air to the alpha valve 208, which then opens. This prevents an operator from washing a contaminated object until the ramp is up and the object is fully contained by the apparatus. The limit valve also feeds air on line 236 to the AND logic element 222 and to the Schrader valve 240. When the Schrader valve is activated, it permits a flow of water to enter the pressure washer via wash path 134. Thus, when the control valve is in the wash position, and the ramp is closed, the pneumatic system activates the pressure washer. The limit valve 232 does not shut off the air signal 212 when the control valve 210 is in the circulate position; thus, water may circulate in the tub when the ramp is down, because this does not pose a safety risk to the operator or the environment.

Figure 8:
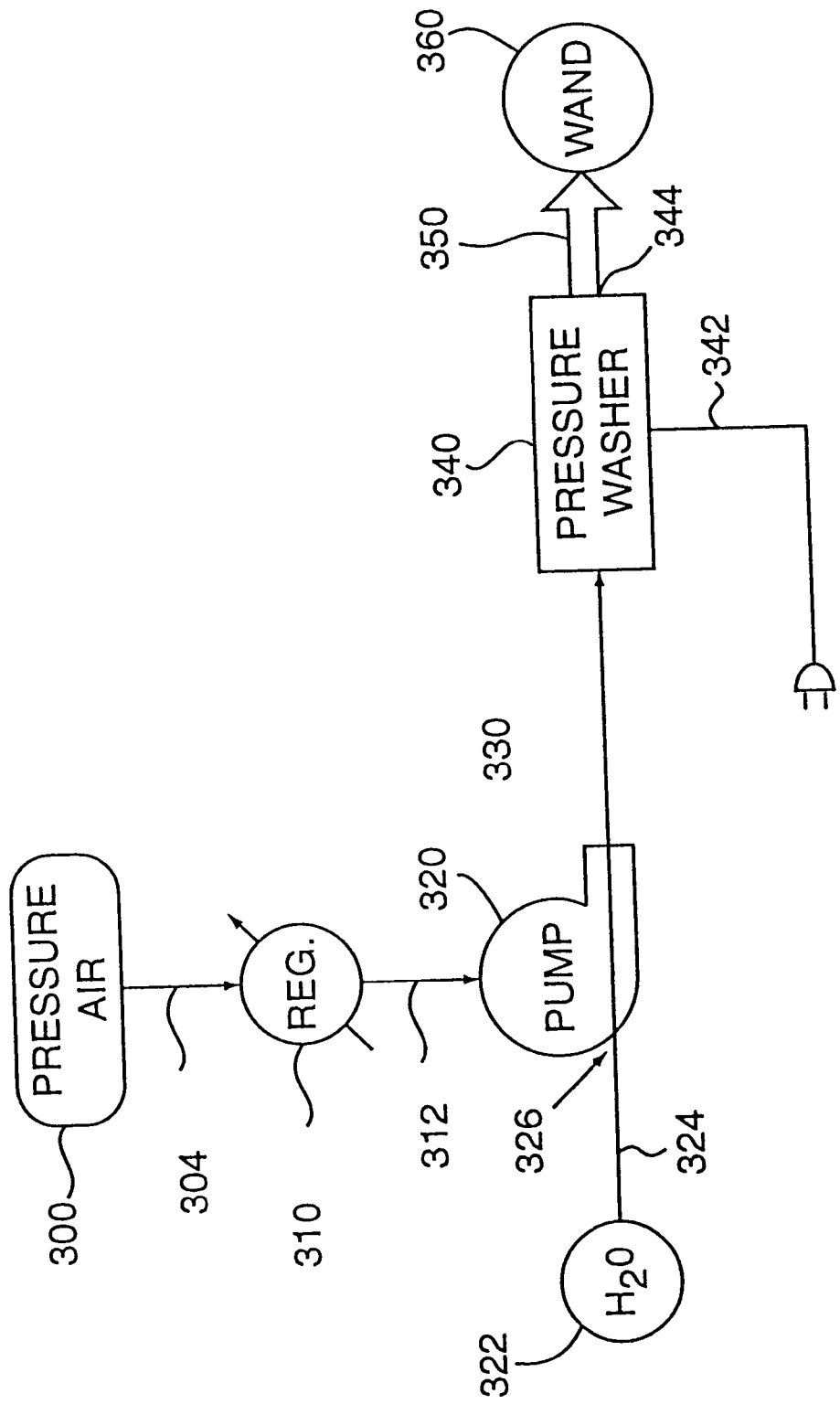
FIG. 8 is a block diagram of a method of optimizing performance of a fluid pump in accordance with the first embodiment of the present invention.

The apparatus described above incorporates a significant advance in the art of pump performance. FIG. 8 shows a method of optimizing the performance of a fluid pump 340 such as a pressure washer in accordance with an embodiment of the present invention. A source of a first fluid under pressure 300 is provided, which may comprise an air compressor, air from a compressed-gas bottle, or the equivalent. Generally the pressure of the fluid source 300 is about 40 pounds per square inch (PSI) to 100 PSI. The pressurized fluid is coupled on a supply line 304 to a regulator 310, such as a manual dial-operated air regulator. The regulator 310 provides air at manually-variable pressure on an output line 312.

The output line 312 is coupled to a second pump 320 which drives a second fluid. The second pump 320 has a supply port 326 for receiving a flow of a second fluid, such as a water supply 322, on a supply line 324. The second fluid is impelled through the second pump and exits through an output port 328 at higher pressure. The second pump may be, for example, an air-operated diaphragm-type pump. This type of pump requires no electricity, so it is safe for use in pumping flammable fluids. The output water pressure of a diaphragm pump is determined by the magnitude of the input air pressure.

The higher pressure output port 328 is coupled on a fluid line 330 to the input port 332 of the fluid pump 340. The fluid pump may be, for example, a pressure washer, which is essentially a high-performance electric water pump. An external electricity supply is provided to the fluid pump 340 by a line cord 342, and powers an electric motor in the fluid pump. The fluid pump produces a high-pressure output stream 350 through a pressurized output port 344. The stream 350 may be coupled to a pressure wash wand to direct the stream onto an object to be washed.

Ordinarily, a fluid pump 340 such as a pressure washer is not coupled to another pump, but is simply connected to a water supply using a hose. Water supplies vary widely in average pressure and instantaneous pressure, so that a particular pressure washer will operate with different efficiency and reliability depending on the quality and consistency of the water source. Indeed, if the water supply is excessively low in pressure, the pressure washer will run in a "starved" condition; the electric motor must work much harder to impel a low-pressure input stream than a higher-pressure input stream for a given output pressure. This generally increases current consumption and significantly shortens the life of the pump motor and internal components of the pump. Since high-quality pressure washers are quite expensive, early failure of the motor and/or pump may be catastrophic.

The way of controlling a pump described above overcomes these problems. By adjusting the regulator 310 to vary the output pressure of the second pump 320, the input stream 330 to the fluid pump 340 may be precisely controlled or "tuned," so that the pump 340 runs under optimum conditions. After the system is running and the pump 340 is generating a high-pressure stream 350, the operator may listen to noise made by the pump 340 and manually adjust or tune the regulator 310 to avoid starving the pump 340. An experienced operator may hear variations in the sound of the pump which indicate stress or non-optimum performance. The operator may also observe gauges showing the pressure in line 312 and line 330 and adjust the pressure in line 330 to a pressure recommended by the manufacturer of the pump 340.

Alternatively, to assist an operator in judging an optimum setting for the regulator 310, a pressure switch is placed in line 330. The pressure switch also protects the heater by shutting it off when insufficient water pressure is present. An electric lamp coupled to the switch glows when sufficient water pressure is present and the heater is on. The pressure switch is preset to turn on at a line pressure which is known to represent ideal input pressure for the fluid pump 340. In this arrangement, an operator may adjust the regulator 310 until the lamp glows. Thus, the lamp provides a visual indication that optimum input water pressure is being provided to the pump 340.

In general, the components shown in FIGS. 1–7 may also operate according to the optimization scheme shown in FIG. 8 and described above. When the control valve 210 is in the wash position, an operator may adjust regulator 310 to provide optimum airflow to pump 104, which generates an output stream of water on line 105 at constant and reliable pressure. This stream feeds the pressure washer 86; thus, by adjusting regulator 310 an operator may quickly and precisely tune and optimize the performance of the pressure washer.

Electrical components, hydraulic components, and pneumatic components of FIGS. 5–7, respectively have generally been described as being suitable for use as a part of a pressure washer which has a fluid flow path described with reference to FIG. 4. However, it should be appreciated that, in general, the components may be incorporated in many other pressure washers. Specifically, the components may be used in pressure washers in which walls, i.e., beams or baffles, within a tub take on a variety of different configurations.

In general, baffles provided within a tub may take on many different configurations. By way of example, as will be described below with respect to FIG. 9, openings may be located near the tops of the walls to facilitate the passage of contaminants, which float near the surface of water in the tub, between chambers or compartments defined by the walls. Alternatively, as will be described below with respect to FIGS. 10 and 11, some walls may include openings near the top, while other walls may be configured, in cooperation with the bottom of a tub which houses the walls, to define openings near the bottom of a tub.

Figure 9:
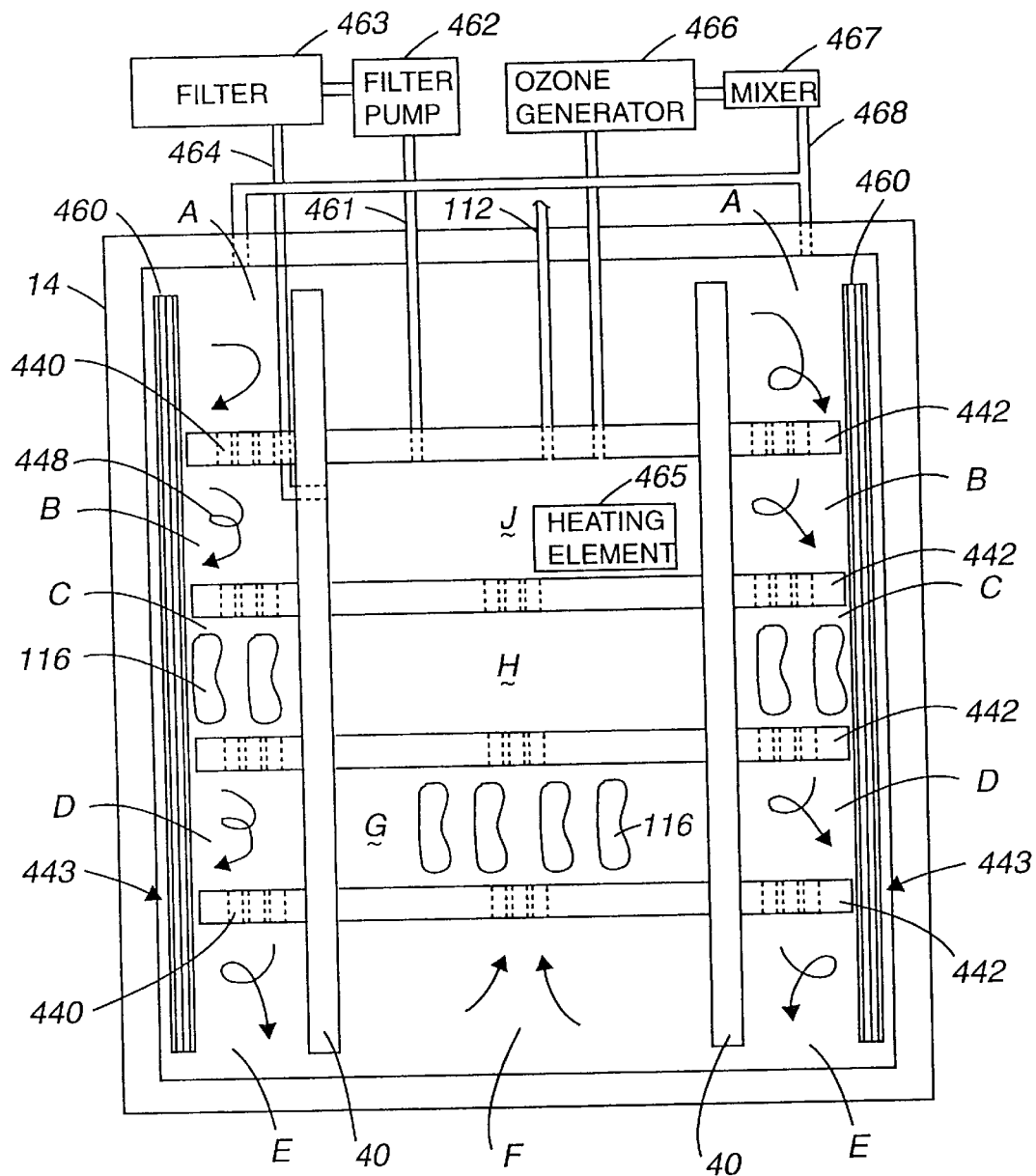
FIG. 9 is a diagrammatic top view representation of a beam arrangement in a washing apparatus with debris filters in accordance with a second embodiment of the present invention.

FIG. 9 is a top view of a beam, or baffle, arrangement in a washing apparatus with debris filters in accordance with a second embodiment of the present invention. When objects to be washed in the washing apparatus are particularly soiled, in addition to contaminants, debris may be washed from the objects. Debris may include heavy particles such as, by way of example, metal shavings and rubber residue. The gap that is provided on three sides of the subfloor placed in the washing apparatus, as described above with respect to FIG. 3, enables washing fluid and debris to flow into the tub. The debris may settle on the floor of the tub, as mentioned above with respect to FIG. 4. However, in one embodiment, debris filters or "gutters," which serve to capture at least some of the debris as it flows through the gap on the sides of the subfloor, may be added to the washing apparatus.

Beams 40, 442 rest in tub 14, and fit snugly against one another to form a plurality of containment compartments A, B, C, D, E, F, G, H, and J, which are similar to the compartments described above with respect to FIG. 4. In the described embodiment, gaps in the subfloor are substantially eliminated, and openings 440 at the surface level of the water are provided in beams 442 to permit oil and other contaminants which rise to the surface of the water to flow between compartments A, B, C, D, E and F. In some embodiments, openings may be provided in beams 40, as well, to facilitate the passage of oil into compartment G, for example.

As previously discussed, when an object is being washed, runoff water and contaminants will initially enter compartments A, B, C, D, and E. The water then tends to swirl around, as shown by arrows, as for example arrow 448, until the water exits the compartments through gaps 443 at the ends of beams 442. Openings 440 are arranged near the top of the water level to enable oil and other contaminants, which have the tendency to float near the top of the water level, to readily flow between compartments. When oil and contaminants flow through openings 440 into compartment C, for example, some oil and contaminants may be absorbed by absorbant socks 116 located in compartment C, while water continues to flow through gaps 443 at the ends of beams 442.

The flow of water is substantially the same as the flow described above with respect to FIG. 4. It should be appreciated, however, that as shown in FIG. 9, water is removed from compartment J through pipe 461, and is processed by a filter pump 462 and a cartridge filter 463, and clean water is piped through pipe 464 back into compartment J. Filter pump 462 may be any suitable pump which is capable of generating an acceptable level of pressure, and may be, but is not limited to being, a pneumatic pump. Compartment J may further includes a heating element 465 which may be used to substantially maintain a desired temperature level within compartment J. Also, in the described embodiment, an ozone generator 466 and a mixer 467 may be arranged to pump a mixture of gas and liquid through pipe 468 into compartment A. It should be appreciated that pipe 468 is split such that the mixture of gas and liquid pumped therethrough provides a substantially equivalent force load to compartment A on both sides of the washing apparatus.

In the described embodiment, absorbent socks 416 are located in compartments C and G, as due to the flow of water in tub 414, it has been observed that oil and other contaminants have a tendency to gather in compartments C and G. Hence, locating absorbent socks 416 in compartments C and G enables a substantial amount of oil to be absorbed from the surface of the water. It should be appreciated, however, that absorbent socks 416 may be located in any suitable compartment.

Although oil-water separators have not been included in the described embodiment, oil-water separators may be included as necessary. As previously described, oil-water separators allow oil and other contaminants to rise to the surface of the separators and discharge in one direction while enabling water to flow in another direction. For embodiments in which the flow of water in tub 14 alone is not sufficient to promote a separation between oil and water, oil-water separators may be included. By way of example, oil-water separators may be oriented in compartment G such that socks 116 located in compartment G may absorb oil discharged from the oil-water separators.

Debris filters 460 are located in gaps 443 to capture at least some of the heavier and larger particles, i.e., debris, that are present in the runoff water. In general, debris filters 460 are arranged such that water may flow through debris filters 460, while debris is captured by debris filters 460. Although debris filters 460 may take any suitable form, in the described embodiment, debris filters 460 are made from a metal mesh material, and are configured as elongated "V-shaped" pieces. Debris filters 460, as shown, are located such that at least some of the runoff water that flows over the sides of a subfloor (not shown) that is typically placed over beams 40, 442 runs through debris filters 460. By collecting debris in debris filters 460, the likelihood of heavy particles obstructing pipes, as for example inlet pipe 112, is reduced.

In general, the features of the washing apparatus described above may vary depending upon the requirements of a particular user. By way of example, the size of the overall washing apparatus may be increased or decreased to accomodate the size of objects which are to be washed using the apparatus. In addition, the individual components associated with the washing apparatus may also vary. For example, as mentioned above with respect to FIGS. 2 and 3, the ramp that is hinged to the base frame of the washing apparatus may take on various other configurations. Alternatively, it should be appreciated that the ramp may be eliminated, and a gate may instead be arranged in place of the ramp.

The organization of beams in a washing apparatus, as well as the relative location of openings in the beams, may also be varied. For example, with reference to FIG. 10, a third embodiment of a beam arrangement within a tub will be described. Baffles 520, 524 are arranged within tub, or basin, 514 such that baffles 520, 524 interlock with respect to one another to define a plurality of compartments M, N, O, P, Q, R, S, and T within tub 514. In the described embodiment, baffles 520, 524 substantially abut sides 528 of tub 514. That is, each end of each baffle 520, 524 abuts a side 528 of tub 514.

To ensure that there is substantially no gap between baffles 520, 524, and sides 528 of tub 514, the ends of baffles 520, 524 are generally attached, e.g., welded, to sides 528 of tub 514. Portions of baffles 520, 524 which contact the bottom of tub 514 are typically also welded to ensure a seal between baffles 520, 524 and the bottom of tub 514. Such a seal essentially prevents water in one chamber from accidentally leaking into another chamber. Although baffles 520, 524 and tub 514 may be fabricated from any suitable material, in the described embodiment, baffles 520, 524 and tub 514 are fabricated from stainless steel, since stainless steel is easily welded, and is resistant to rust.

A subfloor (not shown) which is typically placed over tub 514 is arranged such that when an object is washed, run-off water flows into tub 514 only through debris filters 532. Debris filters 532 serve the purpose of catching debris, e.g., metal shavings, thereby preventing the debris from potentially being drawn into a filter pump 562 and damaging pump 562. Debris filters 532 are generally structures which include fine, i.e., small, openings (not shown) which enable run-off water to pass through while collecting debris. Debris such as sediment or particulate matter, e.g., sand, may also pass through debris filters 532 and eventually settle at the bottom of tub 514. In one embodiment, debris filters 532 are made of a metallic mesh, and have a substantially U-shaped cross-section.

The ends of baffles 524 are shaped such that debris filters 532 may fit between baffles 524 and sides 528 of tub 514, as will be described below with respect to FIGS. 11a–11c. Specifically, the ends of baffles 524 are arranged to abut sides 528 of tub 514 while supporting debris filters 532.

A washing agent, or water, flows through compartments M, N, O, P, Q, R, S, and T in a direction as indicated by arrows 536. The flow pattern is such that water enters compartments M, N, O, and P as water is flowed over an object which is being washed, and flows into compartment Q. From compartment Q, water flows into compartment R which, in the described embodiment, includes capillary socks 540 which are arranged to absorb oil and other contaminants.

Water flows from compartment R to compartment S, which is typically considered to be the "second cleanest" compartment in terms of the amount of oil and sediment which is mixed in with the water once the water reaches compartment S. Water is is removed from compartment S through pipe 561, and is processed by filter pump 562, which may continuously suction water from compartment S, as well as a filter 563. Filter pump 562, which may be a electric diaphragm pump or a pneumatic pump, and filter 563 serve to remove substantially any remaining sediment that still remains in the water, i.e., sediment which has not settled at the bottom of tub 514. In one embodiment, filter pump 562 and filter 563 may be arranged to remove any sediment which has a particle size that is greater than approximately 5 microns in size, although the minimum particle size which is filtered may be widely varied. In general, filter 563 may be any suitable filter, as for example a bag filter or a cartridge filter. Cleaned water is piped from filter 563 through a pipe 564 back into compartment T. As a result, compartment T then generally holds the cleanest water in tub 514.

A pump/wand interface 570 may then draw, or suction, water from compartment T to enable the same water to be recycled to wash an object. That is, the washing apparatus which includes tub 514 may be considered to be a closed-loop system. It should be appreciated that pump/wand interface 570 may generally include a pump which suctions water from compartment T through a pipe 572, a wand through which water may be expelled to wash an object, and pressure regulator to adjust the pressure of water leaving the wand. In one embodiment, pump/wand interface 570 may further include an external water source arrangement which enables water to be drawn from an external source if necessary, e.g., when tub 514 initially contains no water or when water evaporates from tub 514. Such an external water source arrangement is similar to external water source 92 and valve 120 arrangement which was described above with respect to FIG. 7.

The flow patterns, which are developed at least in part by the continuous suctioning by filter pump 562, generally allow run-off water to enter tub 514 in compartment M, N,O, and P. Run-off water is then circulated through compartments M, N, O, and P, and into compartment Q, which is essentially a staging chamber. From compartment Q, run-off water circulates into compartment R, where the water is suctioned by pump 562, and then filtered. Once cleaned, the water is subsequently expelled into compartment T.

As run-off water flows through compartments M, N, O, P, Q, R, S, and T, run-off water may generally pass between the compartments either near the top of the water level, or near the bottom of the water level. Since oil and other contaminants become separated from water as run-off water flows through tub 514, run-off water may pass between compartments near the top of the water level, e.g., operational water level, if it is desired for the passage of oil to be maximized, as for example the run-off water is passing into a compartment which includes socks 540. Alternatively, if it is desired for the passage of oil to be minimized, the passage of run-off water between compartments may occur near the bottom of the water level. One embodiment of the arrangement of openings in baffles 520, 524 through which run-off water may flow will be discussed below with reference to FIGS. 11a, 11b, 11c, and 12.

If it is desired to use heated water to wash an object, a heating element 576 may be included in compartment T to heat the water in compartment T to a desired temperature. However, for embodiments in which it is not necessary to heat water within tub 514 to a particular temperature, heating element 576 may be eliminated.

In the described embodiment, an ozone generator 580 and a mixer 582 may be arranged to pump a mixture of gas and liquid through a pipe 584 into compartments M. Pipe 584 is split such that the mixture of gas and liquid pumped therethrough provides a substantially equivalent force load to compartments M on both sides of the washing apparatus. Ozone generator 580 operates by drawing oxygen from the atmosphere and subjecting the oxygen to ultraviolet radiation.

In addition to being placed in compartment R, as shown, socks 540 are also located in compartments O, as due to the flow of water in tub 514, it has been observed that oil and other contaminants have a tendency to gather in compartments O and R. Hence, locating absorbent socks 540 in compartments O and R enables a substantial amount of oil to be absorbed from the surface of the water. In one embodiment, oil-water separators (not shown) may be included, if necessary, to further promote a separation between oil and water. By way of example, oil-water separators may be oriented in compartments O and R such that socks 540 arranged in compartments O and R may absorb oil discharged from the oil-water separators.

Figure 10:
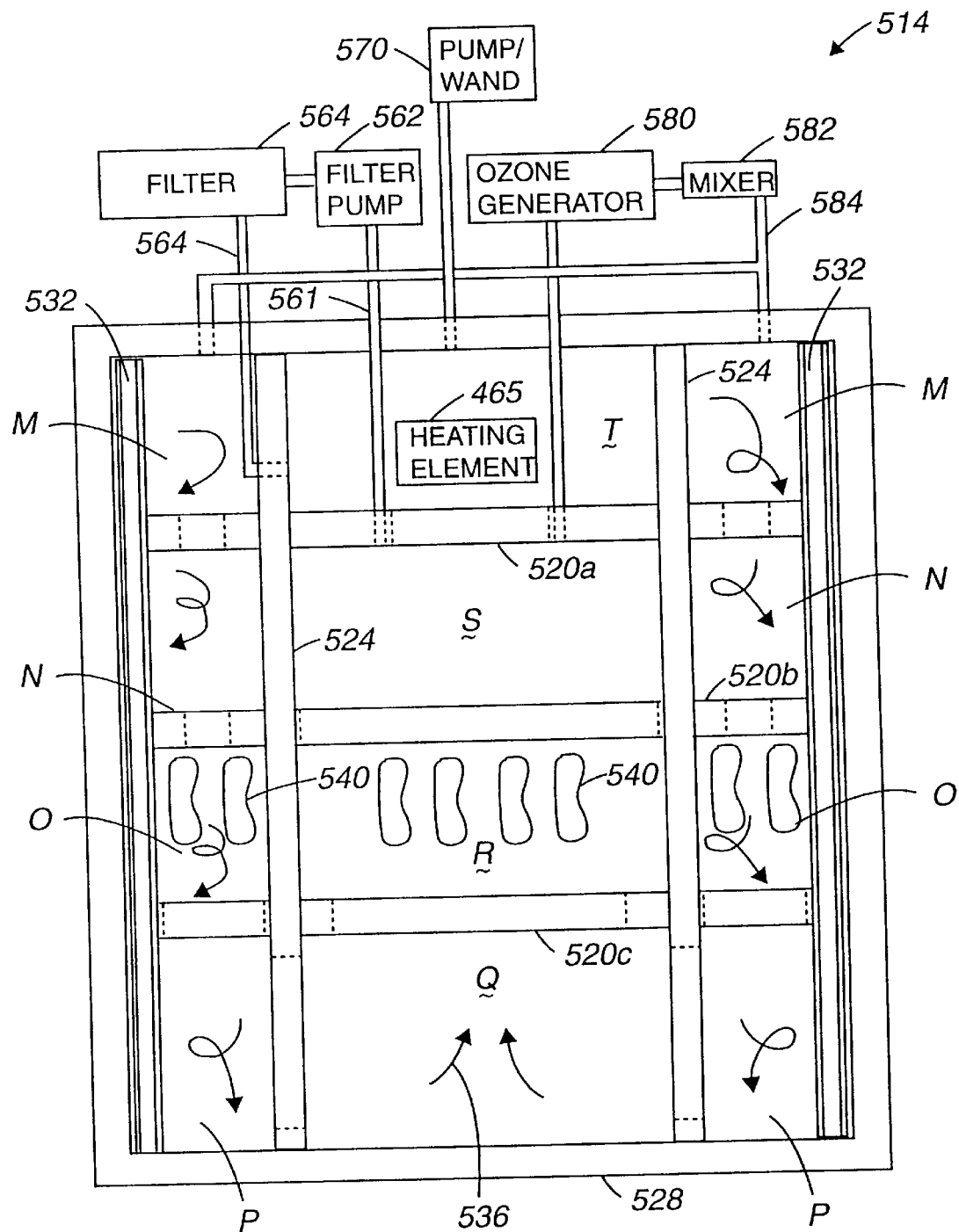
FIG. 10 is a diagrammatic top view representation of a beam arrangement in a washing apparatus with debris filters in accordance with a third embodiment of the present invention.
Figure 11A:
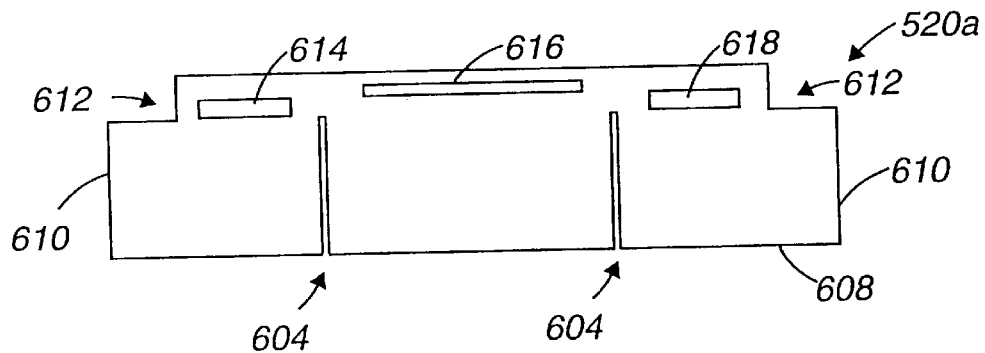
FIG. 11a is a diagrammatic side view representation of beam 520a of FIG. 10 in accordance with the third embodiment of the present invention.

Referring next to FIG. 11a, baffle 520a of FIG. 10 will be described in accordance with the third embodiment of the present invention. Baffle 520a includes slots 604 which enable baffle 520a to be placed over baffles 524, as shown in FIG. 10. Bottom 608 of baffle 520a is arranged to fit against the bottom of tub 514 to enable baffle 520a to be substantially sealed against the bottom of tub 514. Sealing baffle 520a and the bottom of tub 514 serves to thereby prevent water from flowing beneath baffle 520a. Sides 610 of baffle 520a are arranged to be sealed against the sides of tub 514. Corner-portions 612 of baffle 520a are shaped to enable debris filters 532, as described above, to be supported by baffle 520a against the sides of tub 514.

Baffle 520a includes openings 614, 616, 618 which are located in baffle 520a such that openings 614, 616, 618 are substantially at or near the top of the expected water level in tub 514. Openings 614, 616 are located at the interface between chambers M and N, which receive run-off water from a washed object. Hence, run-off water may generally flow from chamber M to chamber N. Opening 616 is located at the interface between chambers S and T, and is arranged to enable cleaned water which overflows from chamber T to flow into chamber S. Such an overflow may occur in the event that too much water is being added to chamber T while not enough water is being drawn out of chamber T.

While the sizes of openings 614, 616, 618 may be widely varied, in the described embodiment, opening 616 is wider but narrower than openings 614, 618. The size of openings 614, 616, 618 is generally dependent upon factors which include, but are not limited to, the size of compartments within tub 514, the flow rate of water through tub 514, and the expected level of water in tub 514. In general, although baffle 520a generally includes openings which support pipes, e.g., pipe 561, openings are not shown for ease of illustration.

Figure 11B:
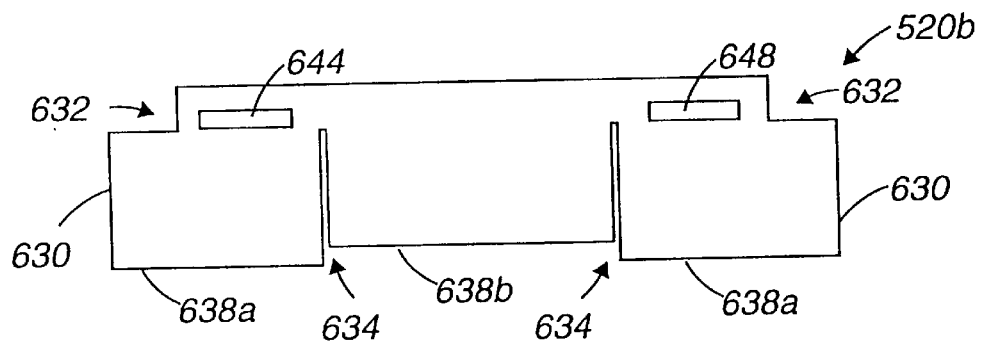
FIG. 11b is a diagrammatic side view representation of beam 520b of FIG. 10 in accordance with the third embodiment of the present invention.

FIG. 11b is a diagrammatic side view representation of baffle 520b of FIG. 10 in accordance with the third embodiment of the present invention. Like baffle 520a, which was described above with respect to FIG. 11a, sides 630 of baffle 520b are arranged to be sealed against the sides of tub 514. Baffle 520b also include slots 634 which facilitate the positioning of baffle 520b in tub 514 of FIG. 10. Corner-portions 632 of baffle 520b are shaped to enable debris filters 532 to be supported by baffle 520b against the sides of tub 514.

Bottom 638 of baffle 520b is "stepped" such that bottom sections 638a are arranged to be sealed, e.g., welded, against the bottom of tub 514. Alternatively, bottom section 638b, together with the bottom of tub 514, is arranged to define an opening near the bottom of tub 514. It should be appreciated that in one embodiment, an opening near the bottom of tub 514 may be defined substantially completely by baffle 520b. The opening defined by bottom section 638b and the bottom of tub 514 enables water to flow from compartment R to compartment S. As discussed earlier, compartment R typically includes socks 540 that skim oil and other contaminants from the surface of water, thereby enabling relatively clean water to pass into compartment S, from which water is drawn by a filter pump. Since oil and other contaminants float near the top surface of the water as oil is separated with water during the course of circulating through tub 514, water located near the bottom of tub 514 has the tendency to include very little, if any, oil and contaminants. Therefore, allowing water to pass through the opening defined by bottom section 638b and the bottom of tub 514 essentially assures that only the cleanest water present in compartment R is allowed to pass into compartment S.

Openings 644 in baffle 520b are placed so that openings 644 are at the expected top surface of water which is circulating in tub 514. Openings 644 are arranged to enable water and, further, oil and contaminants to flow from chamber N to chamber O where, in the described embodiment, socks 540 are located. Openings 644 are located at the top surface of the water since as water circulates, oil and other contaminants tend to rise to the top surface of the water. As such, oil and other contaminants are likely to flow from chamber N through openings 644 into chamber O, where socks 540 may absorb the oil and other contaminants.

Figure 11C:
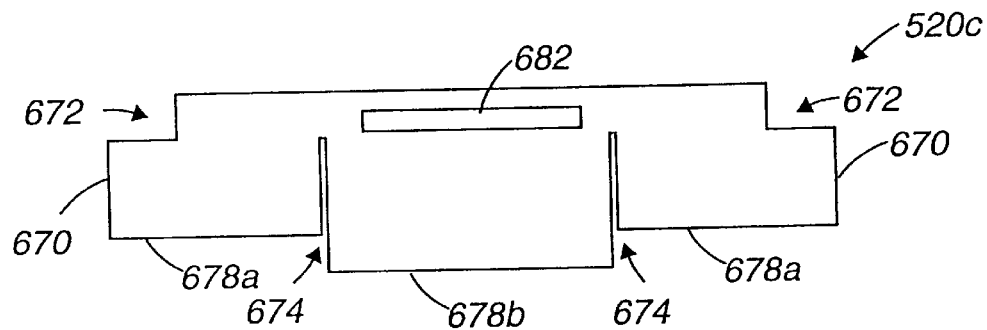
FIG. 11c is a diagrammatic side view representation of beam 520c of FIG. 10 in accordance with the third embodiment of the present invention.

With reference to FIG. 11c, beam 520c of FIG. 10 will be described in accordance with the third embodiment of the present invention. Sides 630 of baffle 520c are arranged to be sealed against the sides of tub 514. Slots 674 are oriented to enable baffle 520c to interlock with baffle 524 as shown in FIG. 10. Corner-portions 672 of baffle 520c are shaped to enable debris filters 532 to be supported by baffle 520c against the sides of tub 514.

Bottom sections 678a of baffle 520c are arranged to, in cooperation with the bottom of tub 514, to define openings near the bottom of tub 514. The openings defined by bottom sections 678a and the bottom of tub 514 enable water to flow from compartment O to compartment P. In the described embodiment, compartment O includes socks 540 which are arranged to absorb oil and other contaminants from near the surface of water flowing in tub 514. As run-off water is circulated through tub 514, oil and other contaminants in the water begin to separate from the water. This separation causes the oil, for example, to float near the top surface of the water during the course of circulating through tub 514. Therefore, allowing water to pass through the openings defined by bottom sections 678b and the bottom of tub 514 enables the cleanest available water present in compartment O to flow into chamber P.

An opening 682 in baffle 520c is positioned at the expected top surface of water which is circulating in tub 514. Opening 682 is positioned to enable water and, further, any oil and contaminants to flow from compartment Q to compartment R, which includes socks 540. Since compartment R includes socks 540, and oil and water tend to separate as run-off water flows through tub 514, positioning opening 682 at the surface of the water level promotes the passage of oil and other contaminants into compartment R, where the oil and the other contaminants may then be substantially absorbed by socks 540.

Figure 12:
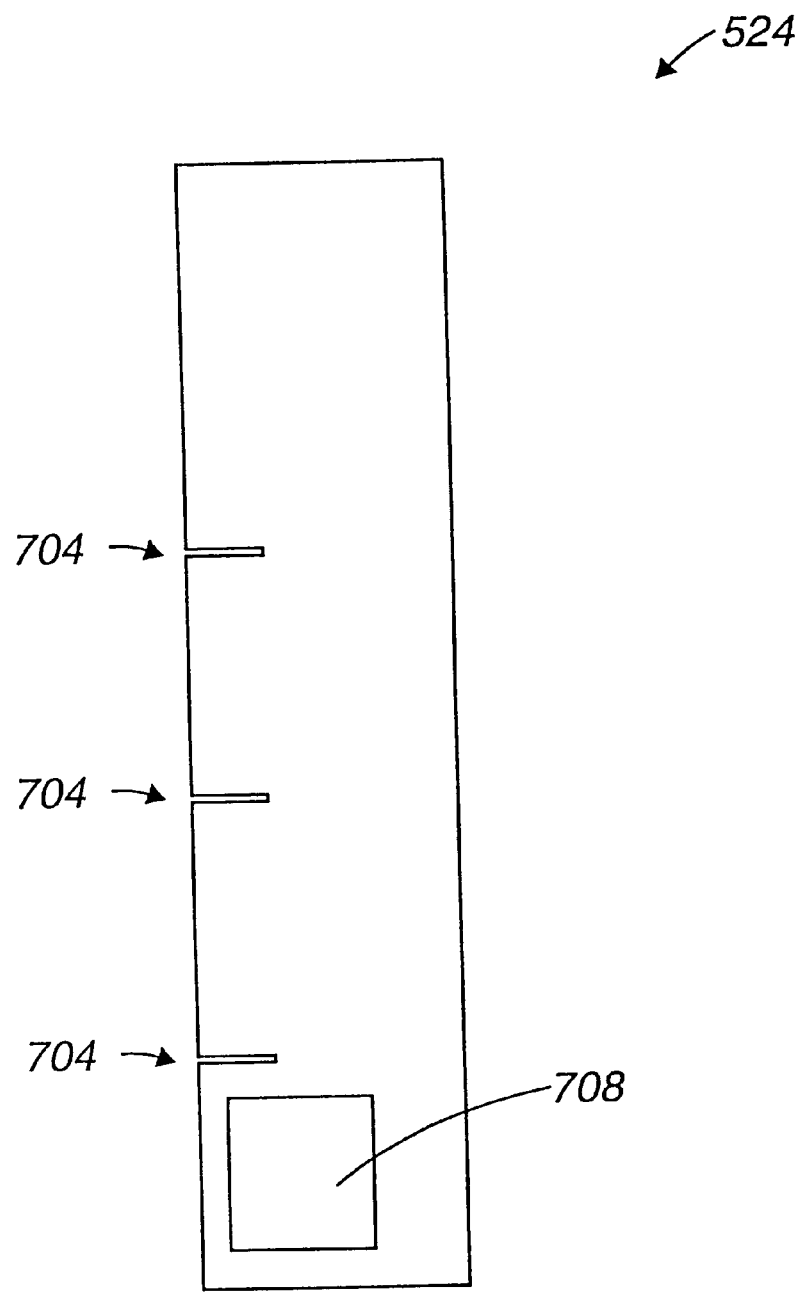
FIG. 12 is a diagrammatic side view representation of beam 524 of FIG. 10 in accordance with the third embodiment of the present invention.

FIG. 12 is a diagrammatic top view representation of baffle 524 of FIG. 10 in accordance with the third embodiment of the present invention. Baffle 524 includes slots 704 which enable baffle 524 to interlock with other baffles, as for example baffles 520 as described above with respect to FIGS. 11a–c. Baffle 524 includes an opening 708 which enables run-off water to circulate from compartment P into compartment Q. As shown, opening 708 is arranged such that the amount of sediment, which has the tendency to sink to the bottom of tub 514 of FIG. 10, may be reduced. In other words, in the described embodiment, opening 708 is positioned to enable "upper" levels of water to pass between compartments P and Q, while essentially preventing "lower" levels of water from passing between compartments P and Q.

In general, the pressure washer described above may be modified for a variety of different washing applications. Specifically, the flow patterns, e.g., the flow pattern described above with respect to FIG. 10, may be utilized as part of washing apparatuses arranged to suit a number of different purposes. By way of example, a pressure washing apparatus which is arranged to remove hardened sediment from an object may use a flow pattern that is similar to the flow pattern described above with respect to FIG. 10.

Figure 13:
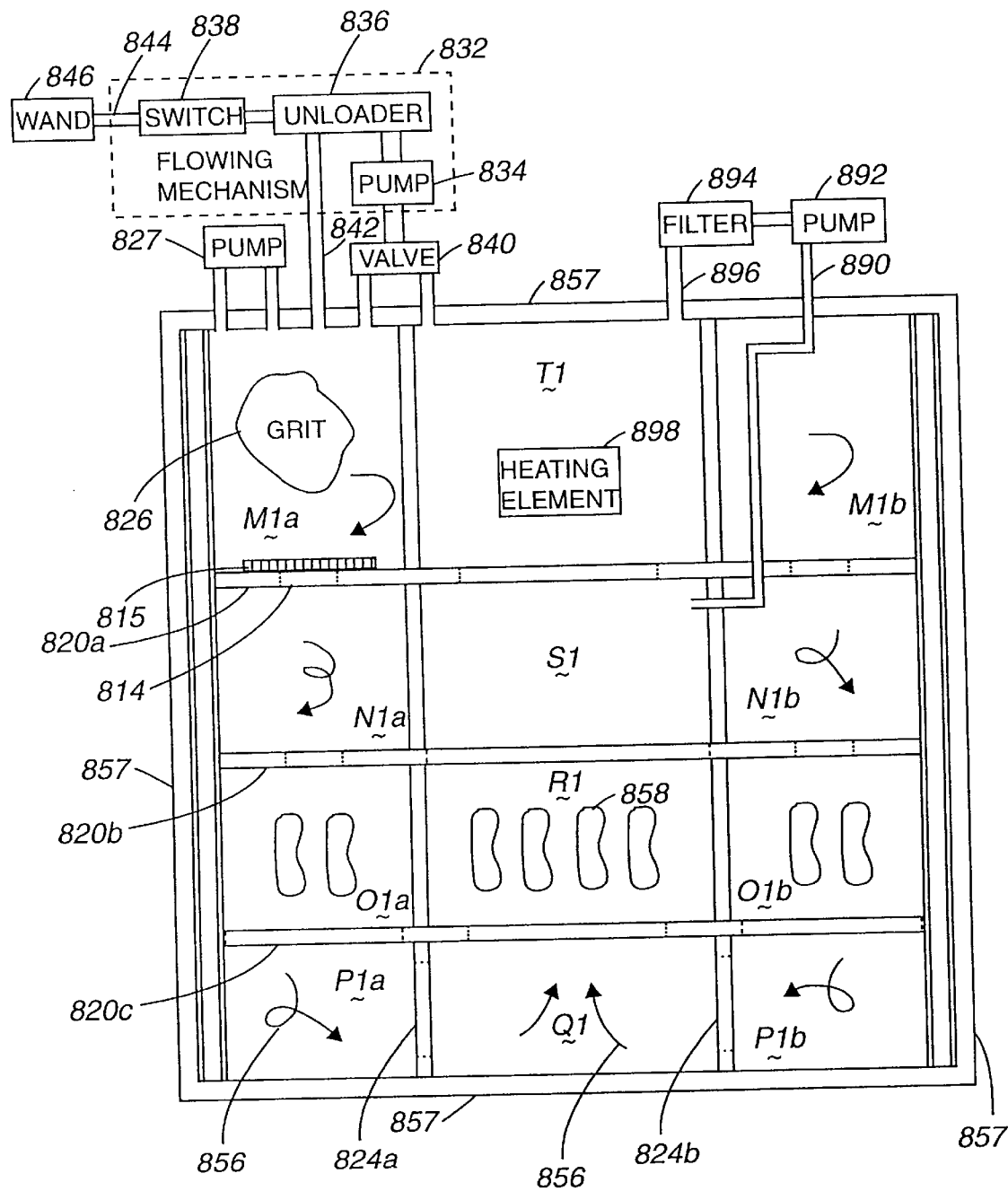
FIG. 13 is a diagrammatic representation of a grit-blasting pressure washing system in accordance with a fourth embodiment of the present invention.

FIG. 13 is a diagrammatic representation of a grit-blasting pressure washing system in accordance with a fourth embodiment of the present invention. A grit-blasting pressure washing system is generally arranged to mix grit into a washing agent such that when the washing agent is flowed over an object that is being washed, the grit may remove hardened sediment, e.g., carbon deposits, from the object. As carbon deposits are generally difficult to remove using pressurized fluid alone, the grit is included to "chisel" away, or otherwise remove, the carbon deposits. In other words, the grit "blasts" deposits off of objects.

A basin 804 includes baffles 820, 824 which are arranged to interlock with respect to one another to define a plurality of compartments M1, N1, O1, P1, Q1, R1, S1, and T1 within basin 804. In the described embodiment, grit 826 is present in compartment M1a. Grit 826 may generally be formed from any essentially particulate material which is suitable for chipping deposits off of an object when forced against the object. By way of example, grit 826 may be made from particles of aluminum oxide. The size of the particles used in grit 826 may be widely varied. In one embodiment, grit 826 may have a size in the range of approximately 200 grit to approximately 400 grit, e.g., 240 grit.

A pump 827, which has an inlet 828 from compartment M1a and an outlet 830 to compartment M1a, is arranged to keep grit 826 mixed with a washing agent, e.g., water, in compartment M1a. Although pump 827 may generally be any suitable compartment, in one embodiment, pump 827 is a centrifugal pump. In order to prevent grit 826 from flowing from compartment M1a through an opening 814 into compartment N1, a filtering mechanism 815 may be arranged to substantially prevent the passage of grit 826 into compartment N1, while allowing water to flow from compartment M1a into compartment N1. Filtering mechanism 815 may take on a variety of different configurations. For example, filtering mechanism 815 may be a wire cloth, such as a 400 mesh screen, which is arranged to obstruct the passage of particles which have grits that are larger than approximately 400 grit.

A flowing mechanism 832 is arranged to flow either water mixed with grit 826 or clean water, i.e., water from compartment T1, over an object (not shown) to wash the object. Specifically, in the described embodiment, a valve 840 couples flowing mechanism 832 to compartments M1a, T1 such that a selection may be made to either flow "gritty" water over an object, or to flow clean water over the object. Although valve 840 may generally be any suitable valve, in one embodiment, valve 840 is a three-way electrically-actuated solenoid valve. The actuation of valve 840, as for example to select gritty water for input to flowing mechanism 832, may occur when a user flips a toggle switch (not shown), pulls a trigger (not shown) on flowing mechanism 832, or both.

Flowing mechanism 832 generally includes a pump 834 coupled to an unloader 836, which is coupled to a switch 838. An outlet 844 is arranged such that water may pass through flowing mechanism 832 and be flowed over an object. In one embodiment, outlet 844 is coupled to a wand 846 which a user may use to flow water over an object.

Pump 834 may be any suitable, standard pump. However, in order to increase the wear resistance of pump 834, pump 834 may be fabricated from stainless steel and ceramic. Unloader 836 is arranged such that when wand 846 is "on," i.e., either gritty water or clean water is being drawn through pump 834, water returns through outlet 842 to compartment M1a, unless a trigger is pulled to allow water to flow out of outlet 844. Switch 838 is a flow switch which, when wand 846 is "on," closes an electric circuit as water flows through flowing mechanism 832.

As shown, water flows through compartments M1, N1, O1, P1, Q1, R1, S1, and T1 in a direction as indicated by arrows 856. The flow pattern is such that water enters substantially only compartment M1a as water is flowed over an object which is being washed. In order to prevent water from running off of an object and directly into other compartments, a subfloor, e.g., subfloor 50 of FIG. 3, may be arranged over basin 804 such that the subfloor is essentially flush with sides 857 of basin 804, except near compartment M1a. Near compartment M1a, spaces between the subfloor and sides 857 are used to enable run-off water to flow substantially only into chamber M1a. As such, given that filtering mechanism 815 prevents grit 826 substantially from flowing into compartment N1, grit in run-off water is prevented from flowing out of compartment M1a as well.

Water flows from compartment M1a into compartments N1a, O1a, and P1a, sequentially. Finally, water flows into compartment Q1. From compartment Q1, water flows into compartment R1 which, in the described embodiment, includes capillary socks 858 which are arranged to absorb oil and other contaminants, e.g., carbon, which may be included within the water. In other embodiments, as for example those in which there is essentially no oil to be absorbed, capillary socks 858 may be eliminated.

Water flows from compartment R1 to compartment S1, which is typically considered to be the "second cleanest" compartment in terms of the amount of contaminatns which are mixed in with the water once the water reaches compartment S. Water is is removed from compartment S1 through pipe 890, and is processed by filter pump 892, which may continuously suction water from compartment S1, as well as a filter 894. Filter pump 892, which may be a electric diaphragm pump or a pneumatic pump, and filter 894 are arranged to remove substantially any remaining sediment that still remains in the water, i.e., sediment which has not settled at the bottom of basin 804. In one embodiment, filter 894 is a bag filter. Cleaned water is piped from filter 894 through a pipe 896 back into compartment T1, where the water may be heated by a heating element 898.

As water, e.g., run-off water, flows through compartments M1a, N1a, O1a, P1a, Q1, R1, S1, and T1, run-off water may generally pass between the compartments either near the top of the water level, or near the bottom of the water level. Since contaminants become separated from water as run-off water flows through basin 804, run-off water may pass between compartments near the top of the water level, e.g., operational water level, if it is desired for the passage of contaminants to be maximized, as for example the run-off water is passing into a compartment which includes socks 858. Alternatively, if it is desired for the passage of contaminants to be minimized, the passage of run-off water between compartments may occur near the bottom of the water level. In one embodiment, baffles 820 and 824 are substantially the same as baffles 520 and 524, respectively, of FIG. 10.

Although only a few embodiments of the present invention have been described, it should be understood that the present invention may be embodied in many other specific forms without departing from the spirit or scope of the invention. By way of example, any suitable mechanism may be used in lieu of absorbent socks for absorbing oil. Further, the locations of these mechanisms, as well as the location of absorbent socks may be widely varied. Similarly, the location of oil-water separators may also be varied. It should be appreciated that in addition to varying the location of oil-water separators, the use of oil-water separators may also be eliminated without departing from the spirit or the scope of the present invention.

In one embodiment, a washing apparatus may be modified for use with a steam cleaner. A steam cleaner is often used with a regular, e.g., city, water supply and, hence, draws water from the water supply. Therefore, when used with a washing apparatus in accordance with the present invention, the washing apparatus may be linked to the same water supply to draw water when necessary, and to dispose of clean water generated at the end of a washing cycle. Since steam has a tendency to adversely affect filter pumps and cartridge filters, the washing apparatus may be modified to include Flo-Jet pumps, which pull run-off water from inlets to the tub of the washing apparatus, e.g., an inlet to the second cleanest compartment of water. Filters, which are separate from the pumps, may be arranged to filter the run-off water for sediment prior to returning the water to the tub, or even directly to an external water supply. Substantially any oil in the run-off water may be collected as the run-off water flows through the flow patterns which were previously discussed.

As described above, a ramp may be included as a part of the washing apparatus to facilitate the loading and the unloading of objects which are to be washed using the washing apparatus. However, it should be appreciated that a separate ramp, or a ramp that is not part of the washing apparatus, may instead be used to move objects into and out of the washing apparatus. By way of example, the washing apparatus may include a gate, e.g., door, through which objects may be moved. An external ramp, or a forklift device, may then be used to facilitate the movement of objects through such a gate on the washing apparatus. In one embodiment, such a gate may be arranged to open more than ninety degrees to enable objects to be more readily moved into and out of the washing apparatus.

In order to further facilitate the washing of an object, a turntable on which an object to be cleaned may be situated, may be placed on the subfloor of a pressure watching apparatus. As a turntable serves to rotate an object while the object is being cleaned, the inclusion of a turntable may serve to improve the cleaning process in many cases.

A splash protection cover may be mounted on a washing apparatus to reduce the amount of water and, further, contaminants which may splash out of the washing apparatus. A splash protection cover may simply be placed over the washing apparatus and mounted using devices such as screws and locks. Alternatively, a splash protection cover may be mounted using a suspension system which enables the splash protection cover and the splash protection shield to be pivotably moved with respect to the washing apparatus, e.g., the splash protection cover shield may be hinged to the washing apparatus.

The dimensions of the washing apparatus and features thereof may also be widely varied without departing from the spirit or the scope of the present invention. By way of example, if objects such as aircraft engines, which have dimensions that are larger than the dimensions of the washing apparatus described above, are to be washed, the dimensions of the washing apparatus may be modified to accomodate the objects. Similarly, the dimensions of the washing apparatus may also be modified to accomodate small objects.

Further, the materials used in the fabrication of the washing apparatus described above may be varied depending upon factors which include the washing agent to be used with the washing apparatus and the type of object which is to be washed. All components of the washing apparatus, including pumps, may be fabricated from a material such as stainless steel in the event that de-ionized water is to be used as the washing agent, as will be appreciated by those skilled in the art.

In a grit-blasting pressure washing system used to wash objects which include very little oil, a washing apparatus may include substantially only two or three chambers, as the need to circulate and separate oil from water during the circulation diminishes. In such a system, one chamber may be arranged to hold grit and to receive run-off water, while a second chamber may be arranged to hold grit-free water. A third chamber may be an intermediate, "staging," chamber without departing from the spirit or the scope of the present invention. Therefore, the present examples are to be considered as illustrative and not restrictive, and the invention is not to be limited to the details given herein, but may be modified within the scope of the appended claims.

We claim:

1. An apparatus for washing an object having a contaminant, the apparatus being arranged to recover the contaminant, the apparatus comprising:

a support floor for supporting an object to be washed;

a basin mounted below the support floor, the basin being divided into plurality of chambers including a clean water chamber, a secondary water chamber, and an oil containment chamber, and a contaminated water receiving chamber arranged to receive a contaminated water which is flowed over the object to remove the contaminant, wherein contaminated water received in the contaminated water receiving chamber must pass sequentially through the oil containment chamber and the secondary water chamber prior to entering the clean water chamber, wherein the clean water chamber is flowably coupled to the secondary water chamber by a first flowpath near the operational water level, the secondary water chamber is flowably coupled to the oil containment chamber by a second flowpath near the bottom of the basin, the oil containment chamber is flowably coupled to the contaminated water receiving chamber by a third flowpath near the operational water level;

a first pump assembly arranged to draw and filter water from the secondary water chamber and return the filtered water to the clean water chamber; and whereby water pumped from the clean water chamber may be used to wash contaminants from the object and a circulation flowpath defined by the chambers promotes the removal of the contaminants from the contaminated water.

2. An apparatus as recited in claim 1 wherein the first pump assembly is further arranged to circulate the water through the circulation flowpath.

3. An apparatus as recited in claim 1 wherein the contaminant includes oil and debris, the apparatus further includes a debris filter arrangement to collect at least some of the debris while enabling the contaminated water to pass through to the contaminated water receiving chamber.

4. An apparatus as recited in claim 3 wherein the debris filter arrangement is an elongated, substantially U-shaped filter.

5. An apparatus as recited in claim 1 wherein the contaminant includes oil and debris, and the apparatus further includes an oil collector, the collector being arranged to absorb the contaminant, wherein the oil collector is located in the oil containment chamber.

6. An apparatus as recited in claim 1 further including a flowing mechanism for flowing the water over the object.

7. An apparatus as recited in claim 6 wherein the flowing mechanism includes a second pump assembly arranged to draw water from a second inlet to the clean water chamber and to return water through a second outlet to the basin.

8. An apparatus as recited in claim 1 wherein the first flowpath near the operational water level which flowably couples the clean water chamber to the secondary water chamber is located slightly above the operational water level.

9. An apparatus as recited in claim 1 wherein the third flowpath near the operational water level which flowably couples the oil containment chamber to the receiving chamber is at least partially below the operational water level.

10. An apparatus as recited in claim 1 wherein the contaminant includes oil, and the contaminated water receiving chamber is divided into a plurality of flowably coupled subchambers which are further flowably coupled to a staging chamber which is flowably coupled to the oil containment chamber by the third flowpath near the operational water level.

11. An apparatus as recited in claim 10 wherein at least one of the subchambers includes an oil collector arranged to absorb the oil in the contaminated water.

12. An apparatus as recited in claim 1 wherein the basin is fabricated from a stainless-steel.

13. An apparatus as recited in claim 1 further including:

an ozone generator; and a gas-liquid mixer arrangement connected to the ozone generator, wherein the gas-liquid mixer arranged injects ozone into the water.

14. A method for washing an object with water, the object having a contaminant, the method comprising:

placing the object over a basin divided into a plurality of chambers including a contaminated water receiving chamber, a secondary water chamber, an oil containment chamber, and a clean water chamber;

flowing water over the object to remove the contaminant from the object;

receiving contaminated water in the contaminated water receiving chamber;

circulating the water through the chambers, wherein circulating the water through the chambers includes circulating contaminated water received in the contaminated water receiving chamber sequentially through the oil containment chamber and the secondary water chamber prior to entering the clean water chamber, wherein the contaminated water is circulated near a top of an operational water level between the secondary water chamber and the oil containment chamber and near the bottom of the basin between the oil containment chamber and the secondary water chamber;

drawing the water from the secondary water chamber through a first inlet to the secondary water chamber;

filtering the water drawn from the secondary water chamber; and returning the filtered water through a first outlet to the clean water chamber.

15. A method for washing an object as recited in claim 14 wherein the contaminant includes debris and oil, the method further including collecting the oil in the oil containment chamber.

16. A method for washing an object as recited in claim 15 further including filtering at least some of the debris from the contaminated water.

17. A method for washing an object as recited in claim 14 further including injecting ozone into the basin.

18. An apparatus for washing an object having a contaminant, the apparatus being arranged to recover the contaminant, the apparatus comprising:

a support floor for supporting an object to be washed;

a basin mounted below the support floor, the basin being divided into plurality of chambers including a clean water chamber, a secondary water chamber, and a containment chamber, and a contaminated water receiving chamber arranged to hold grit and to receive a contaminated water which is flowed over the object to remove the contaminant, wherein contaminated water received in the contaminated water receiving chamber must pass sequentially through the containment chamber and the secondary water chamber prior to entering the clean water chamber, wherein the clean water chamber is flowably coupled to the secondary water chamber by a first flowpath near the operational water level, the secondary water chamber is flowably coupled to the containment chamber by a second flowpath near the bottom of the basin, the containment chamber is flowably coupled to the contaminated water receiving chamber by a third flowpath near the operational water level;

a first pump assembly arranged to draw and filter water from the secondary water chamber and return the filtered water to the clean water chamber;

a second pump assembly arranged to mix grit with water in the grit supply chamber, wherein the grit supply chamber is flowably coupled to the contaminated water receiving chamber;

a third pump assembly arranged to draw water mixed with the grit from the grit supply chamber; and whereby water pumped from the clean water chamber may be used to wash contaminants from the object, a circulation flowpath defined by the chambers promotes the removal of the contaminants from the contaminated water, and water pumped from the grit supply chamber may be used to chisel away contaminants from the object.

19. An apparatus as recited in claim 18 wherein the grit includes aluminum oxide particles, the aluminum oxide particles having a particle size in the range of approximately 200 grit to approximately 400 grit.

* * * * *